(12) United States Patent
Nelson et al.

(10) Patent No.: US 7,546,552 B2
(45) Date of Patent: Jun. 9, 2009

(54) SYSTEM AND METHOD OF ATTRACTING, SURVEYING, AND MARKETING TO CONSUMERS

(75) Inventors: Dean Francis Nelson, Mercer Island, WA (US); Mary Bacarella, Seattle, WA (US)

(73) Assignee: Space Needle LLC, Seattle, WA (US)

( * ) Notice: Subject to any disclaimer, the term of this patent is extended or adjusted under 35 U.S.C. 154(b) by 0 days.

(21) Appl. No.: 11/749,745

(22) Filed: May 16, 2007

(65) Prior Publication Data

US 2008/0060004 A1      Mar. 6, 2008

Related U.S. Application Data

(60) Provisional application No. 60/747,412, filed on May 16, 2006, provisional application No. 60/894,442, filed on Mar. 12, 2007.

(51) Int. Cl.
  *G06F 13/00* (2006.01)
  *G06F 15/00* (2006.01)
(52) U.S. Cl. ........................................ 715/851; 715/855
(58) Field of Classification Search ................ 715/731, 715/853, 203–204, 700, 851, 846, 854–855, 715/788, 738; 345/156, 419
See application file for complete search history.

(56) References Cited

U.S. PATENT DOCUMENTS

| | | | |
|---|---|---|---|
| 6,321,158 B1 * | 11/2001 | DeLorme et al. | 701/201 |
| 2005/0203768 A1 * | 9/2005 | Florance et al. | 705/1 |
| 2007/0008279 A1 * | 1/2007 | Benford et al. | 345/156 |

\* cited by examiner

*Primary Examiner*—Kevin Nguyen
(74) *Attorney, Agent, or Firm*—Richard T. Black; Black Lowe & Graham PLLC

(57) ABSTRACT

One method of the present invention includes displaying an interactive map to a consumer and recording interactions with the consumer, recording the interactions, analyzing the recordings, and acting on the analysis. The interactive map is provided at a tourist attraction or other location, and includes maps, images, cameras, and other information about the area surrounding the attraction, as well as information about other attractions, that is useful and/or interesting to a consumer. The interactive media include remote-controlled cameras, touch screen monitors, joysticks, and various other controls. Recording the interactions of the consumers includes recording touches, page views, clicks, session lengths, itineraries selected, and other interactions. Analyzing includes analyzing to find consumer preferences among locations presented. Acting on the results of the analyses includes contacting and forming networks with entities in the area surrounding the tourist hub or remote locations, including contacting and forming networks with other tourist hubs.

10 Claims, 32 Drawing Sheets

1060

US 7,546,552 B2

SYSTEM AND METHOD OF ATTRACTING, SURVEYING, AND MARKETING TO CONSUMERS

PRIORITY DATE

This application claims priority to U.S. Provisional Application Ser. No. 60/747,412 filed May 16, 2006 and to U.S. Provisional Application Ser. No. 60/894,442 filed Mar. 12, 2007 The foregoing applications are hereby incorporated by reference in their entireties as if fully set forth herein.

COPYRIGHT NOTICE

This disclosure is protected under United States and International Copyright Laws. © 2006-2007 The Space Needle Corporation. All Rights Reserved. Portions of the disclosure of this patent application contain material which is subject to copyright protection. The copyright owner reserves all copyright rights whatsoever.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

A method according to an embodiment of the present invention includes enhancing a view-based tourist destination by enabling destination guests to connect with, interact with, and explore the view, and the viewed areas, and any related areas or issues of interest, using a variety of technologies. A method according to an embodiment of the present invention includes enhancing the appeal of a view-based tourist destination by displaying at least one video image of a viewable area surrounding the destination, the at least one video image captured by one or more video capture devices located proximate the destination and enabling a tourist to interactively alter the video image by controlling the video capture device. A method according to an embodiment of the present invention further includes presenting to said tourist further information related to the viewable area surrounding the destination.

A method according to an embodiment of the present invention includes displaying an interactive map to a consumer and recording interactions with a consumer, initiated by the consumer or the purveyor of the interactive map.

In various embodiments, the interactive map is provided at a tourist attraction or other location with a view of an area surrounding the location, and includes maps, images, cameras, and other information about the area surrounding the attraction, or a remote location, as well as information about other attractions, that is useful and/or interesting to a tourist, visitor, or consumer. The interactive media include remote-controlled cameras, touch screen monitors, keyboards, joysticks, and various other controls.

Recording the interactions of the consumers includes recording touches, page views, clicks, session lengths, content selected, images saved, itineraries selected, and other inputs to a computer, as well as audio, video, and other means of input of the consumers interacting with the media.

Further embodiments include analyzing the recorded interactions and acting on the results of the analysis. Analyzing includes analyzing to find consumer preferences among locations presented. Acting on the results of the analyses includes contacting and forming networks with businesses, tourist attractions, and other entities in the area surrounding the tourist hub or remote locations, including contacting and forming networks with other tourist hubs. The networks can include networks of local and remote computers for data exchange, and can facilitate the expansion of future business opportunities such as sponsorship, branding, etc. Acting also includes maintaining web sites for and generating content from both locals and tourists.

An embodiment according to the present invention can include a client-server-type computer network, with content provided at the client computers, and recording and analysis performed and stored at the server computer(s).

Figure 1:
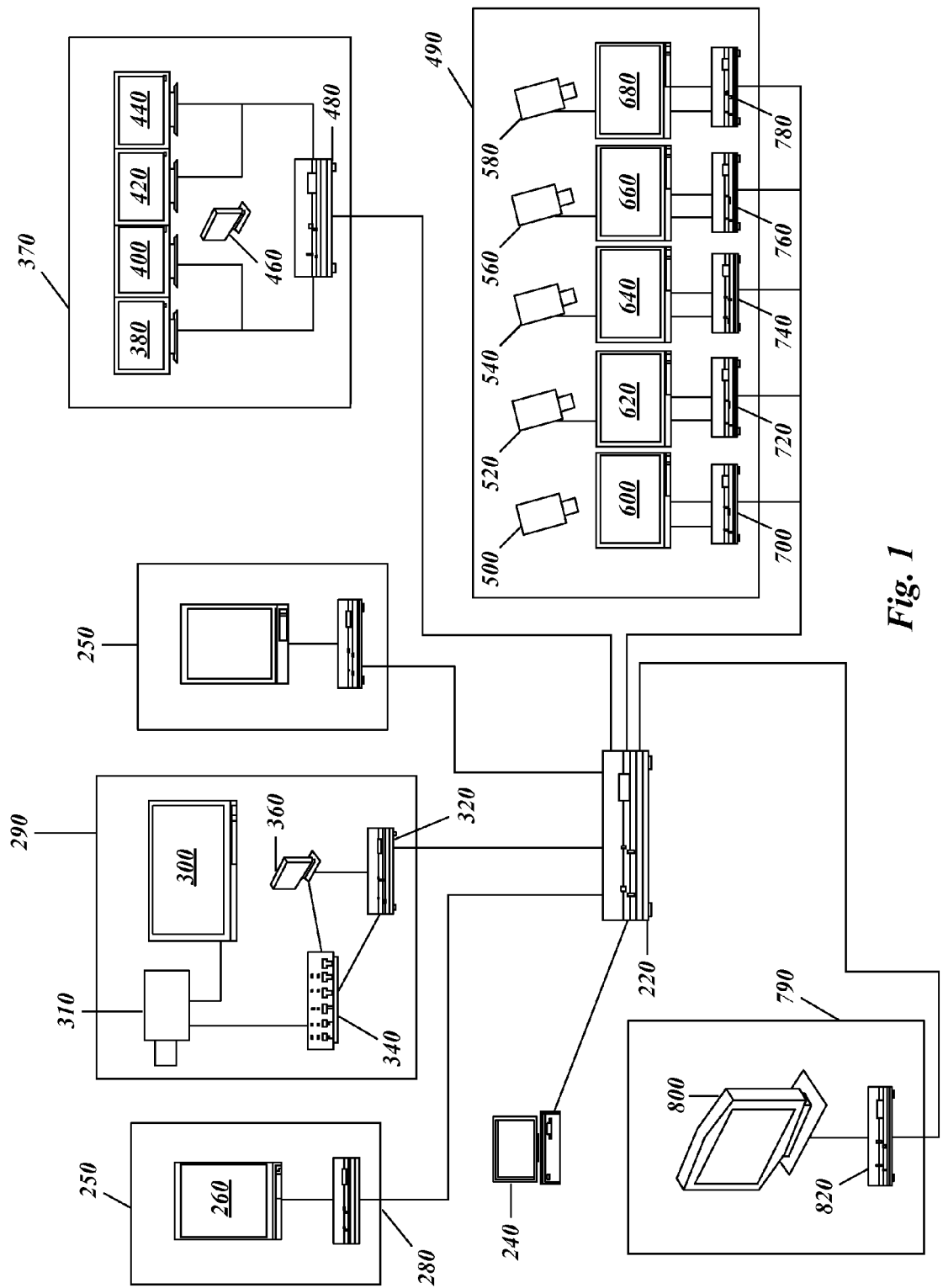
FIG. 1 is a conceptual diagram of an embodiment of a computer network of an embodiment of the present invention.
Figure 2:
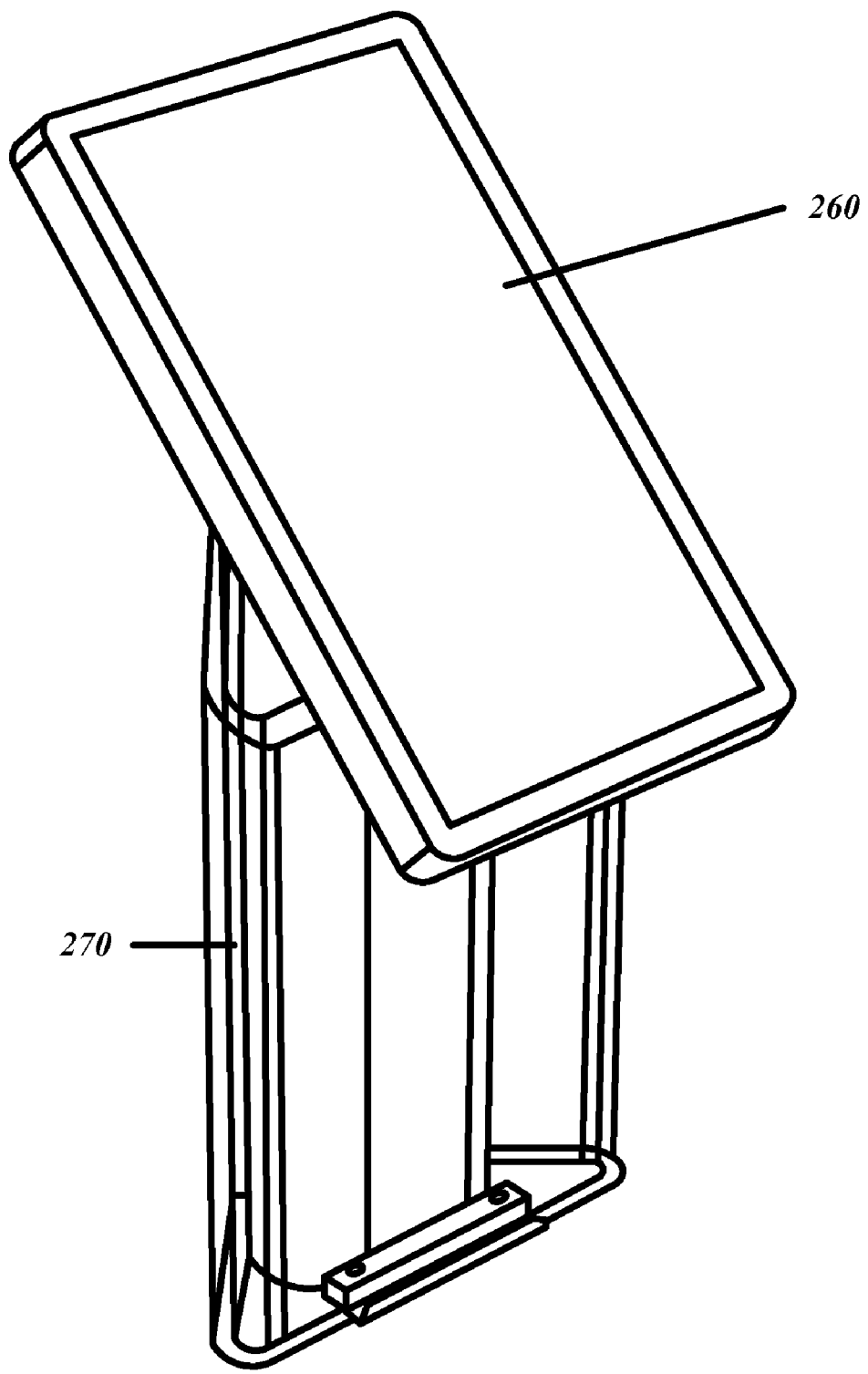
FIG. 2 shows portions of a map station according to an embodiment of the present invention.
Figure 3:
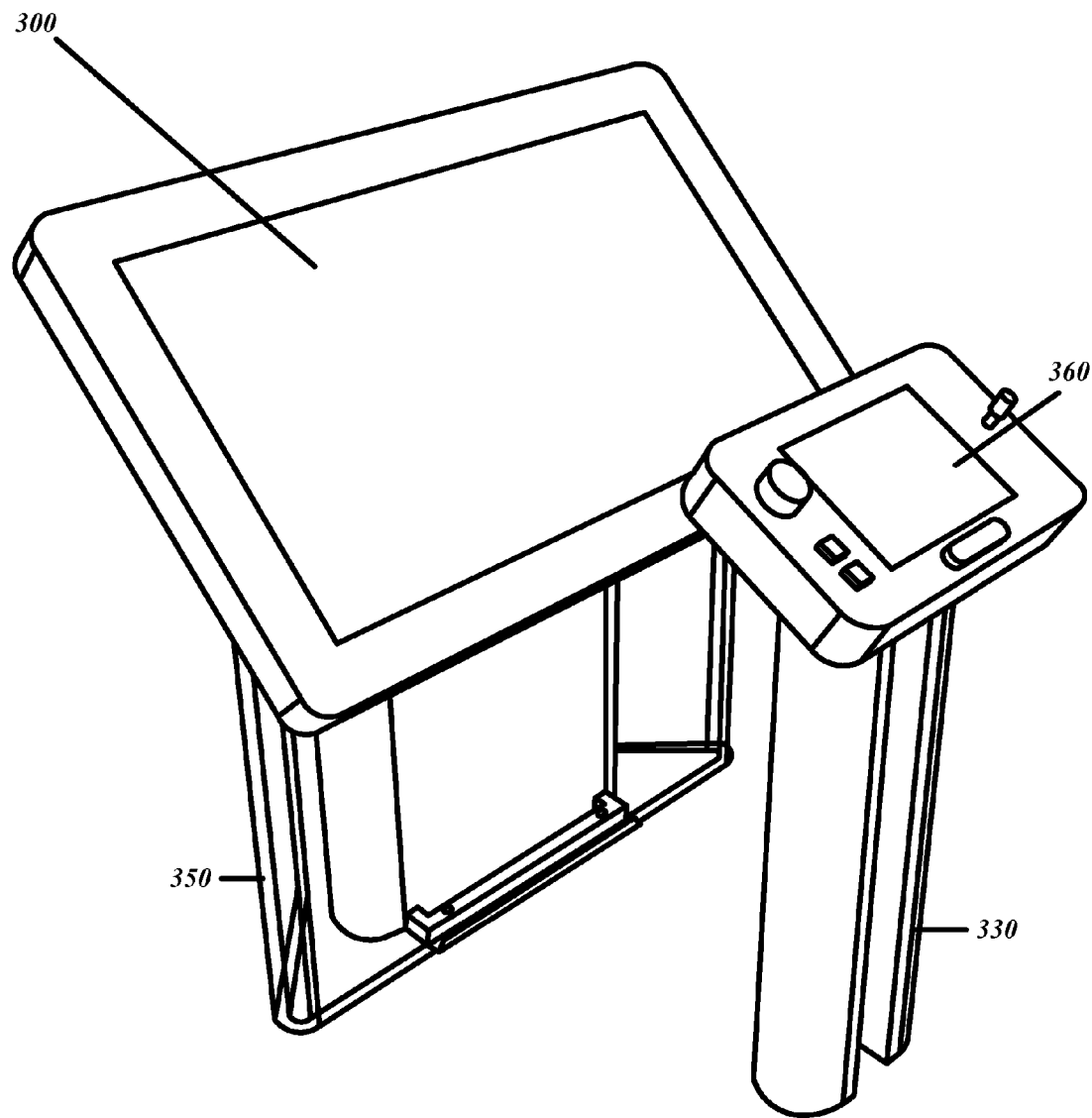
FIG. 3 shows portions of a camera station according to an embodiment of the present invention.

FIG. 1 shows an embodiment of a computer network 200 according to the present invention. The network 200 includes a server computer 220, an administration computer 240, and various combinations and groupings of map stations 250, camera stations 290, time-lapse stations 370, reveal stations 490, and vignette stations 790. Stations can include any interactive device for presenting information to a user or accepting user information, including remote devices such as cameras and user input devices. Stations can be wired or wirelessly connected to each other or the server computer 220 over the network 200.

Figure 7A:
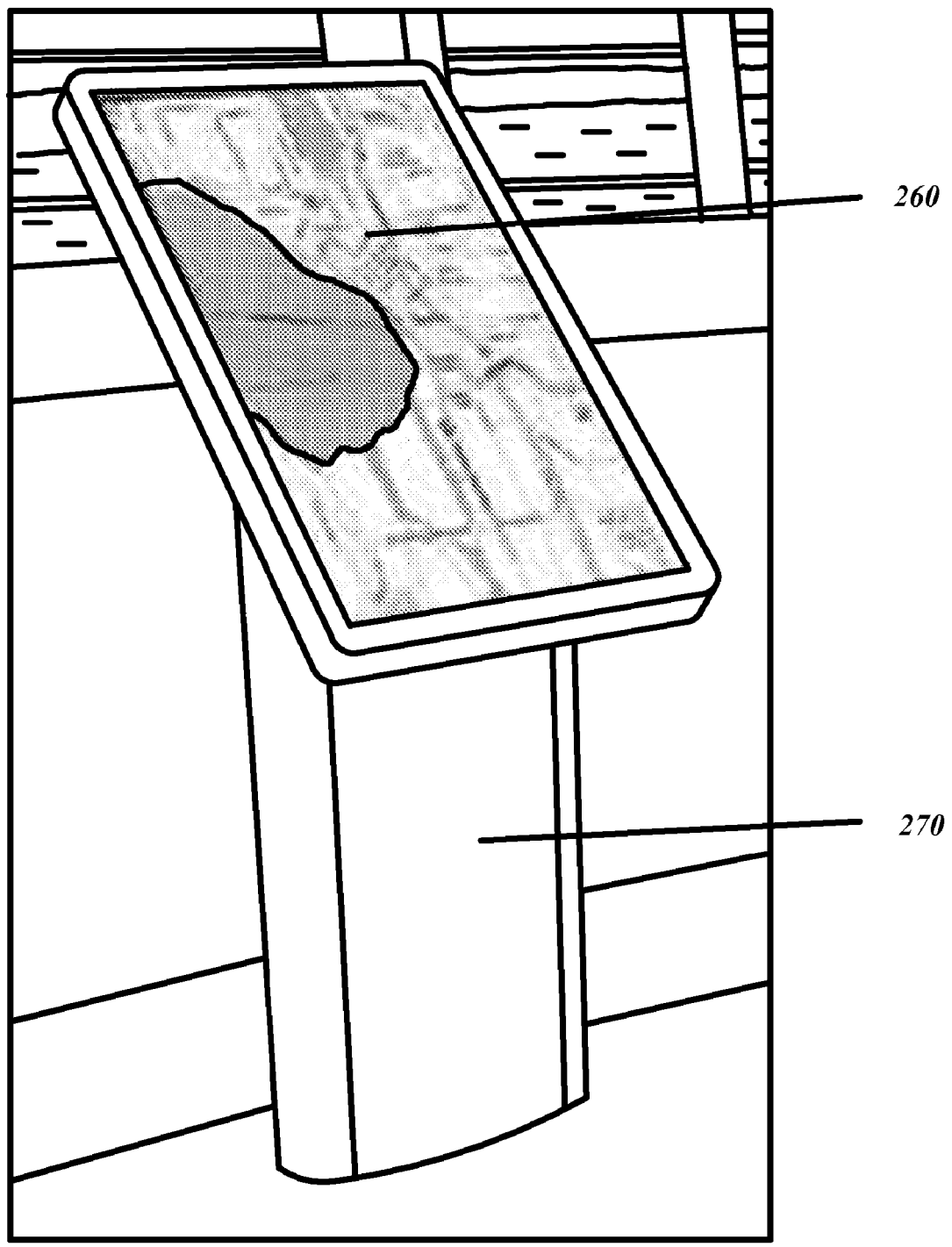
FIG. 7A shows a portion of a map station according to an embodiment of the present invention.
Figure 7B:
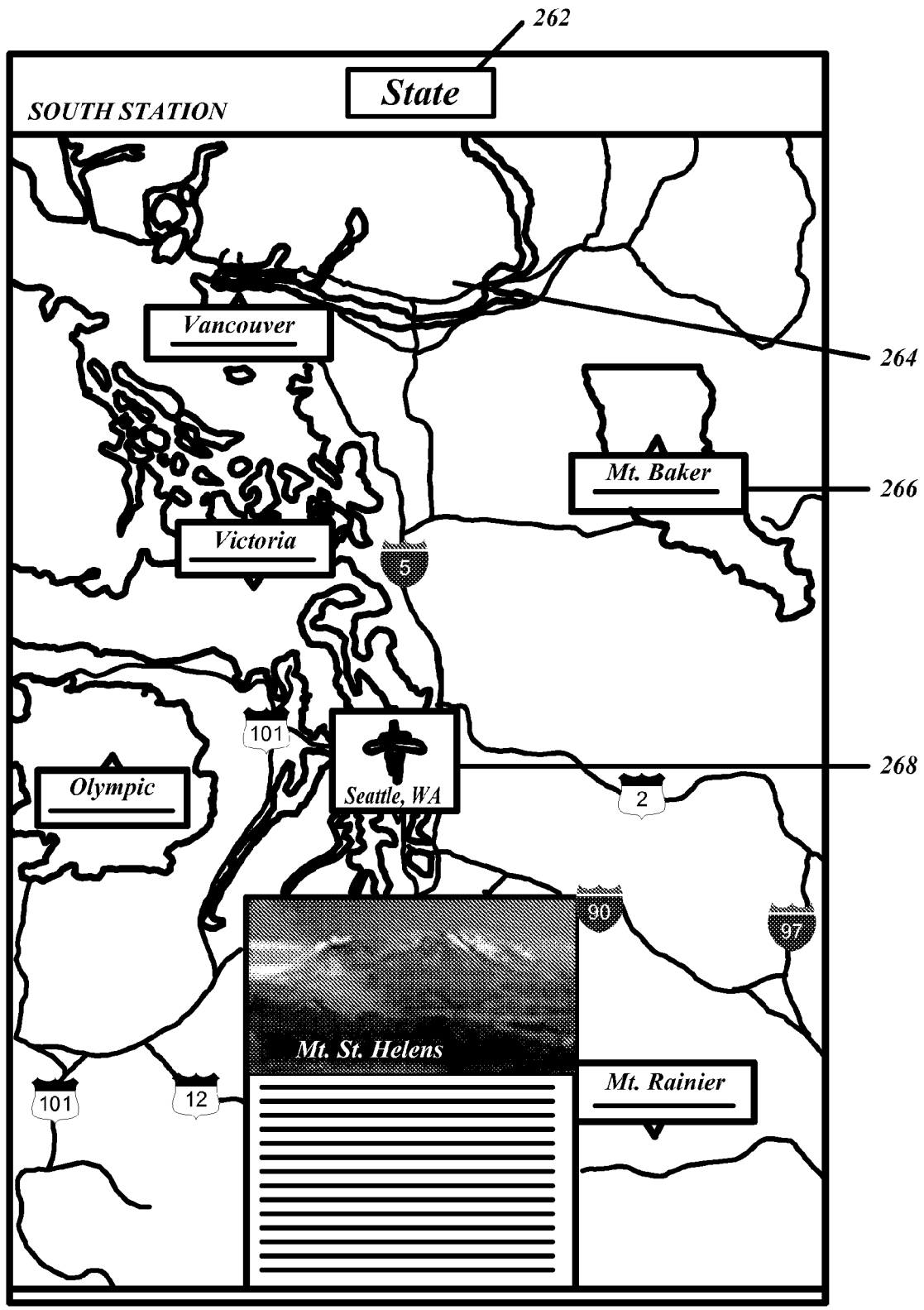
FIGS. 7B, 7C, and 7D show a map display displaying maps at "State," "County," and "City" levels of detail, respectively.
Figure 7C:
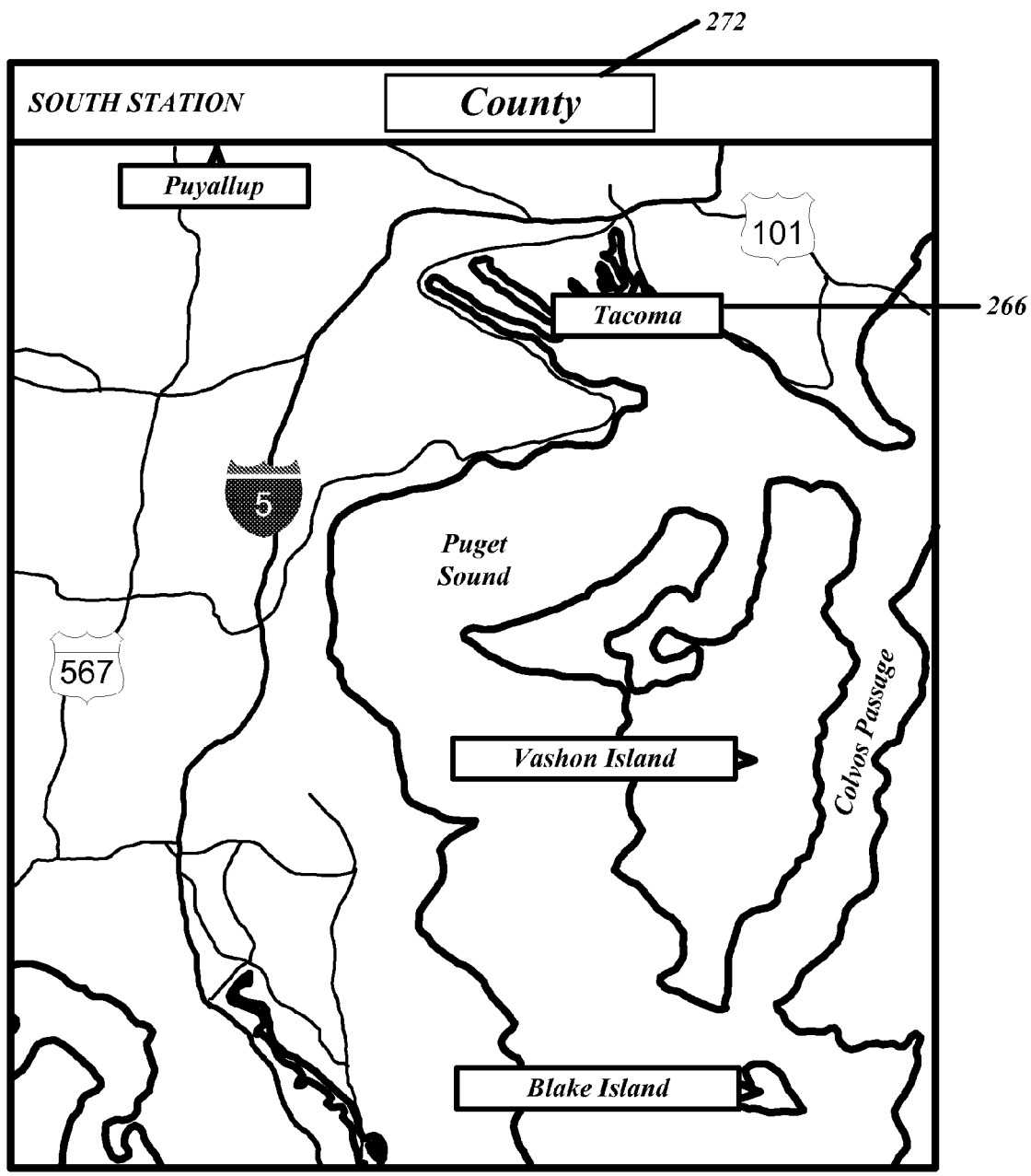
Figure 7D:
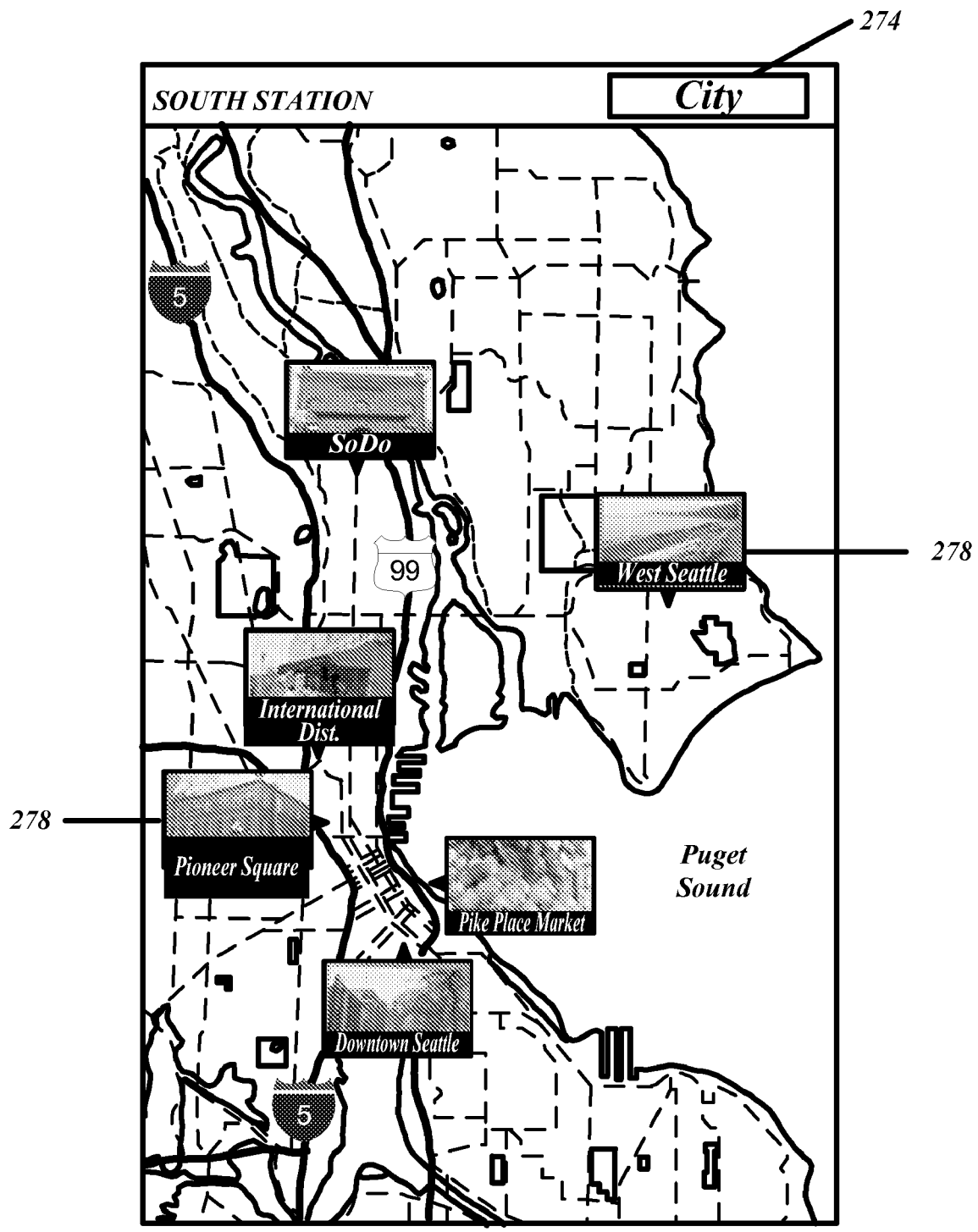
Figure 7E:
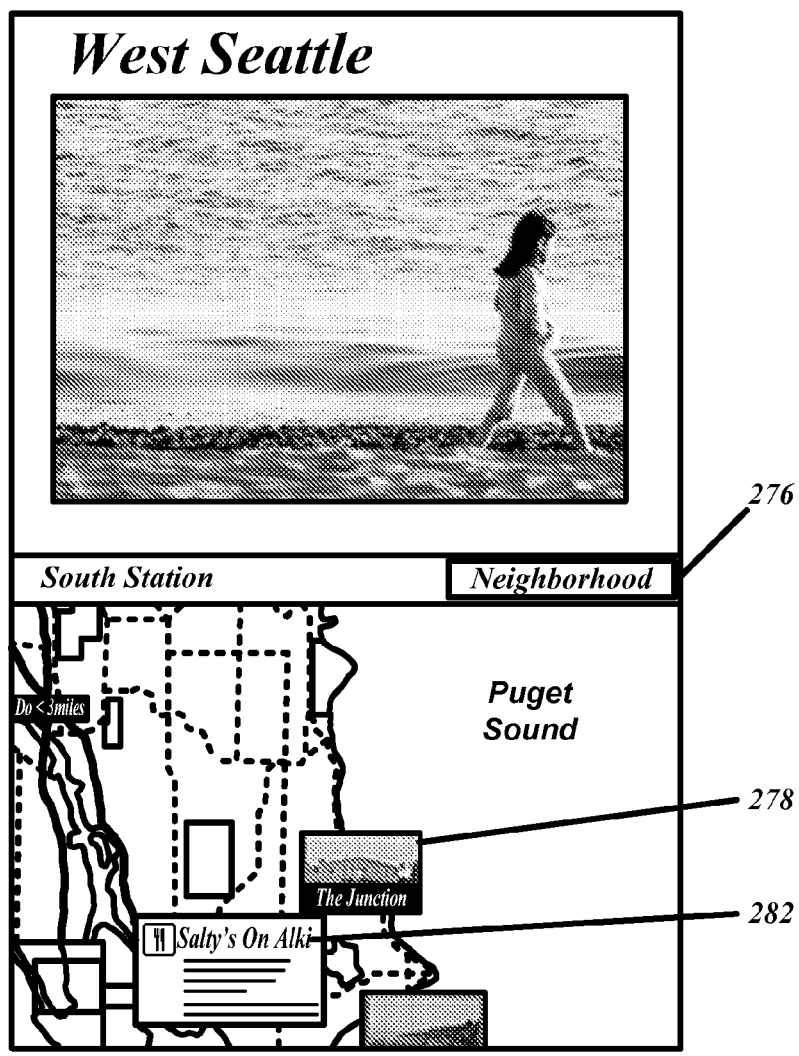
FIGS. 7E, 7F, and 7G show alternate embodiments of maps at a "Neighborhood" level of detail.
Figure 7F:
Figure 7G:
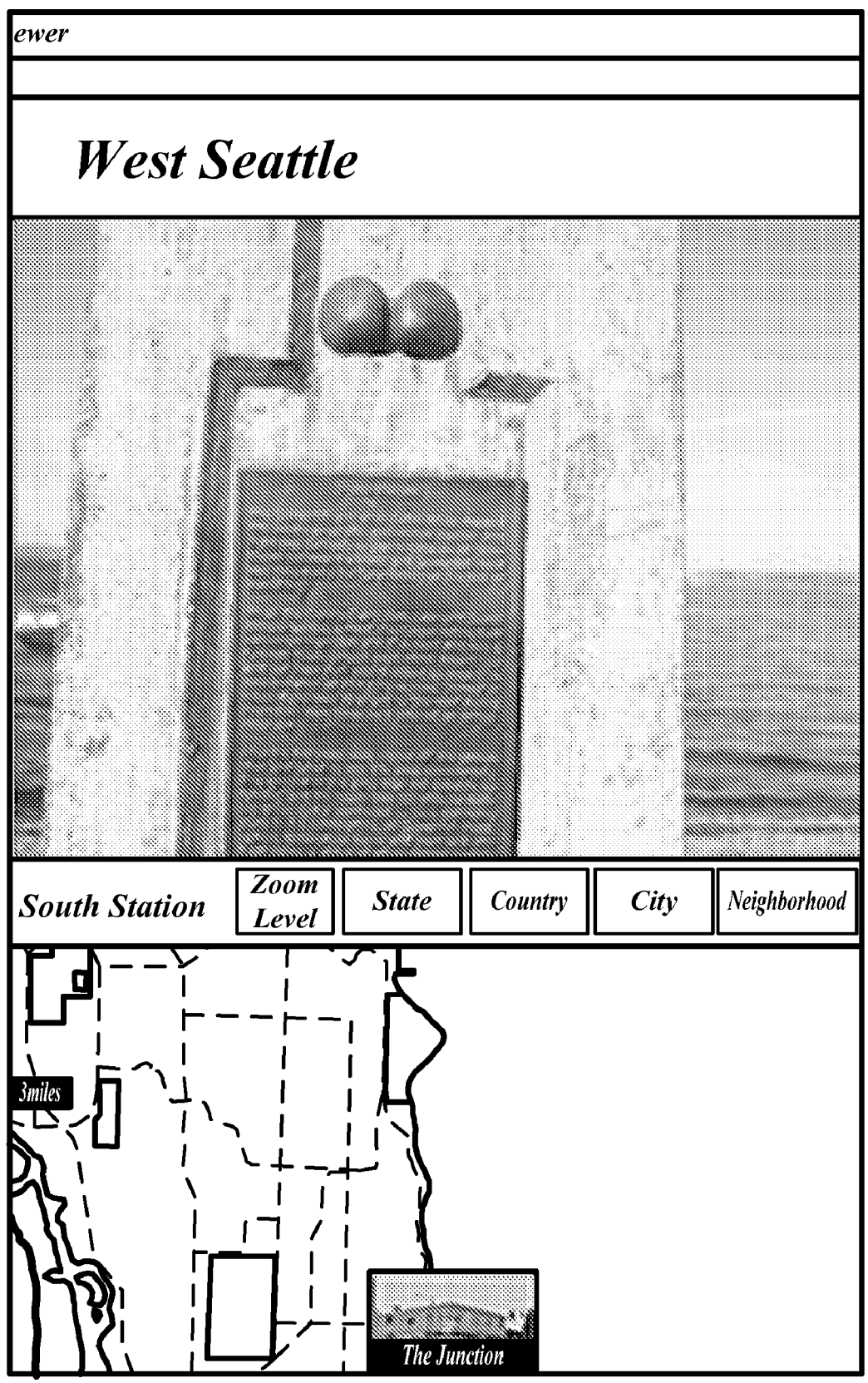

The map station 250 (FIGS. 1, 2, and 7A-7G) includes a map display 260, a map computer 280, and a map kiosk 270. Each map kiosk 270 supports a map display 260. The content includes an illustrated map with navigable icons allowing users to access sub-maps and points of interest on the maps, linking between sub-maps, and selection of points of interest to display multi-media information. The icons may include (FIGS. 7B-7G) a "State" icon 262 which displays a map 264 of the state with additional icons 266, 268 at points of interest. The icons may include "County," "City," and "Neighborhood" icons 272, 274, 276, respectively with similar functionality. Users can also type addresses and retrieve maps of the corresponding location. At the Neighborhood level, the display 260 can include a split screen display (FIGS. 7E-7G) with a map of the neighborhood on one screen and a picture, live feed, or other content displayed on the other screen. As can be seen in FIG. 7E, icons 278 at businesses and other points of interest may be touched by a user to open a window 282 with more information and options about the business or point of interest; businesses partnered with a practitioner of an embodiment of the invention can supply content to be presented in the window 282. The maps (and icons) can be rendered topographically (or in three dimensions) with controls to rotate, move, and zoom. The station 250 (and any other station) may also include stereoscopic vision technology, such as that described in U.S. Pat. Nos. 5,821,989, 6,927,769, 6,950,121, and 7,006,125, and herein incorporated by reference.

Figure 8A:
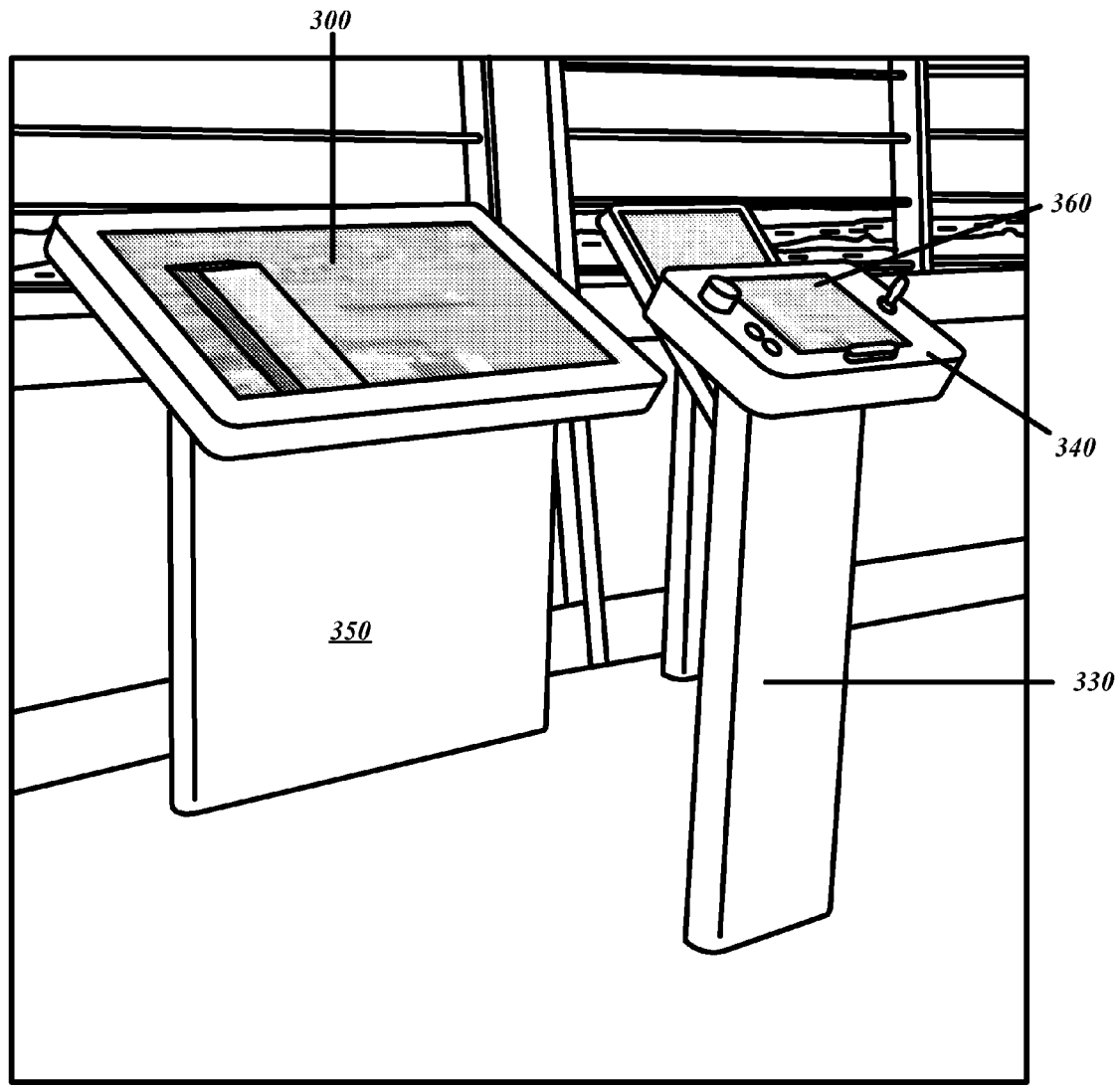
FIG. 8A shows a portion of a camera station according to an embodiment of the present invention.
Figure 8B:
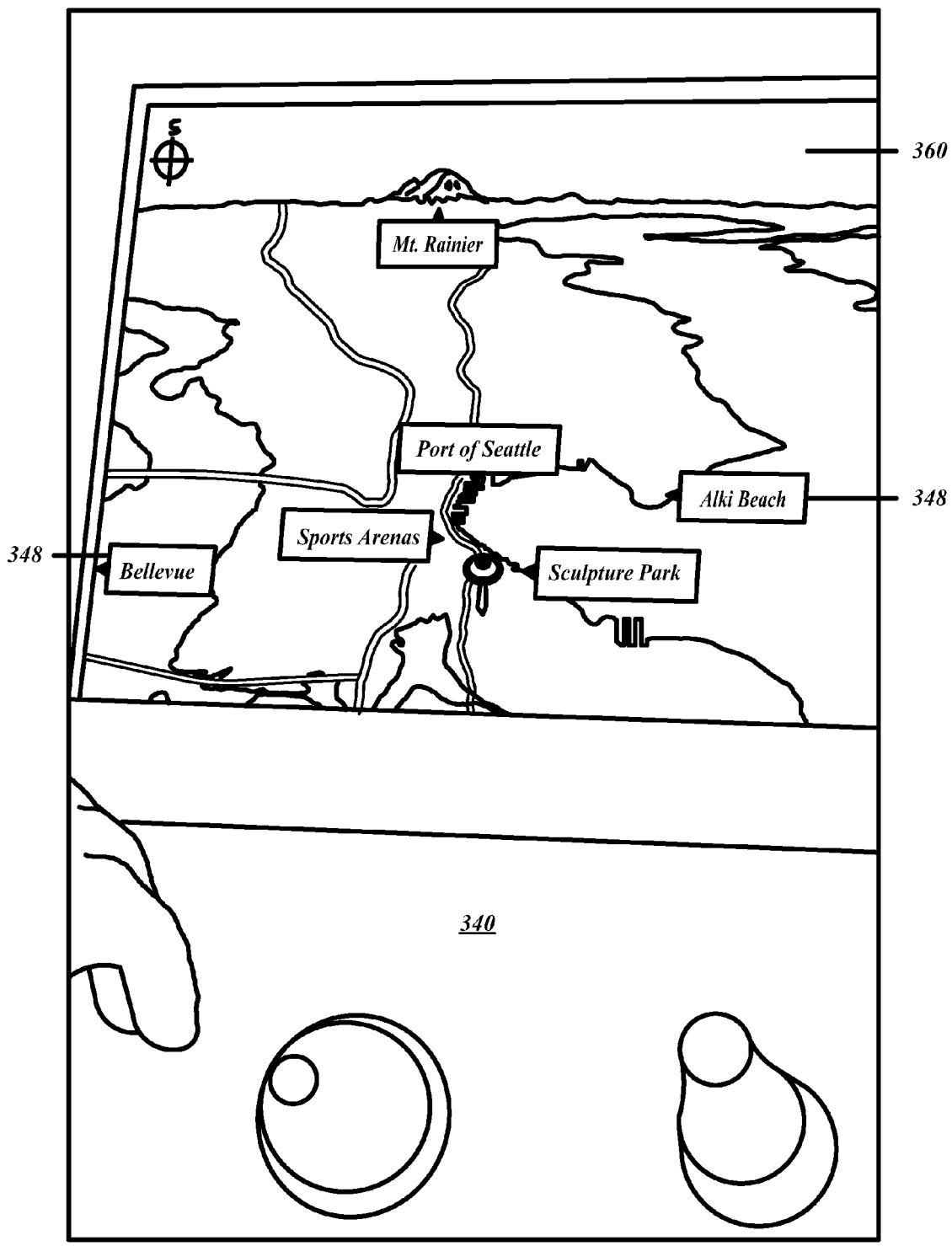
FIGS. 8B and 8C show a touch screen and controls, respectively, of the camera station of FIG. 8A.
Figure 8C:
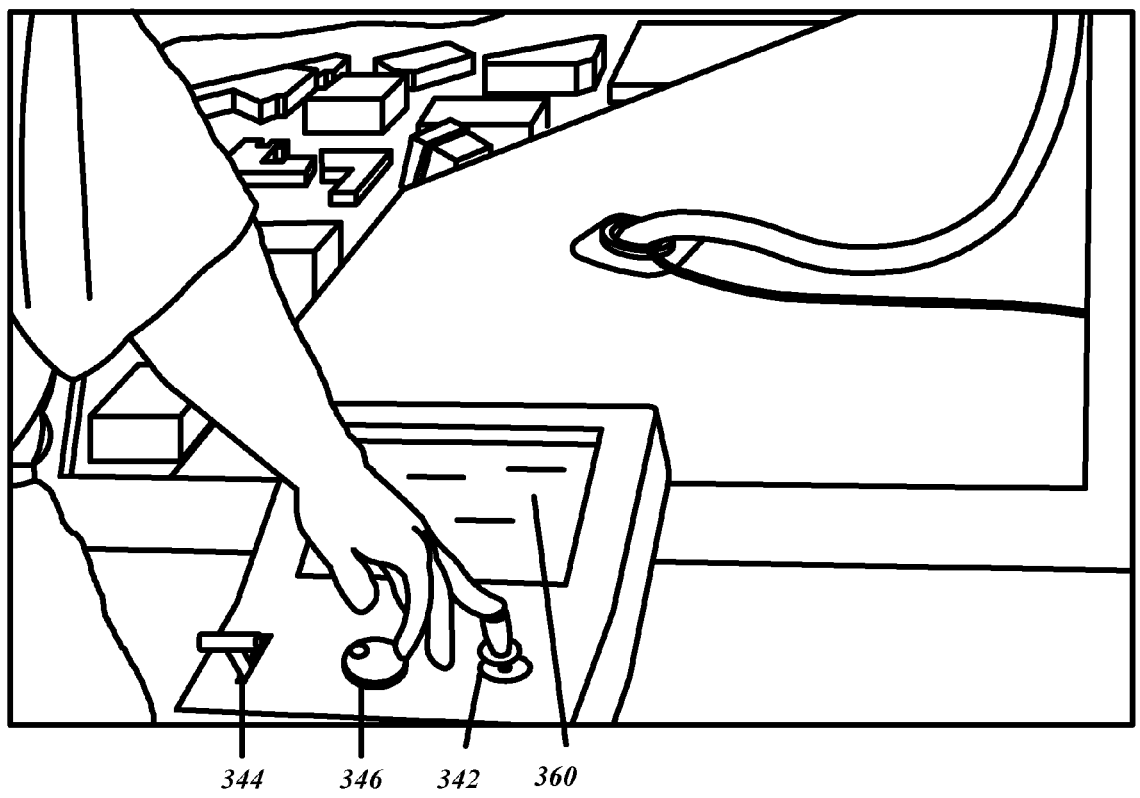
Figure 9:
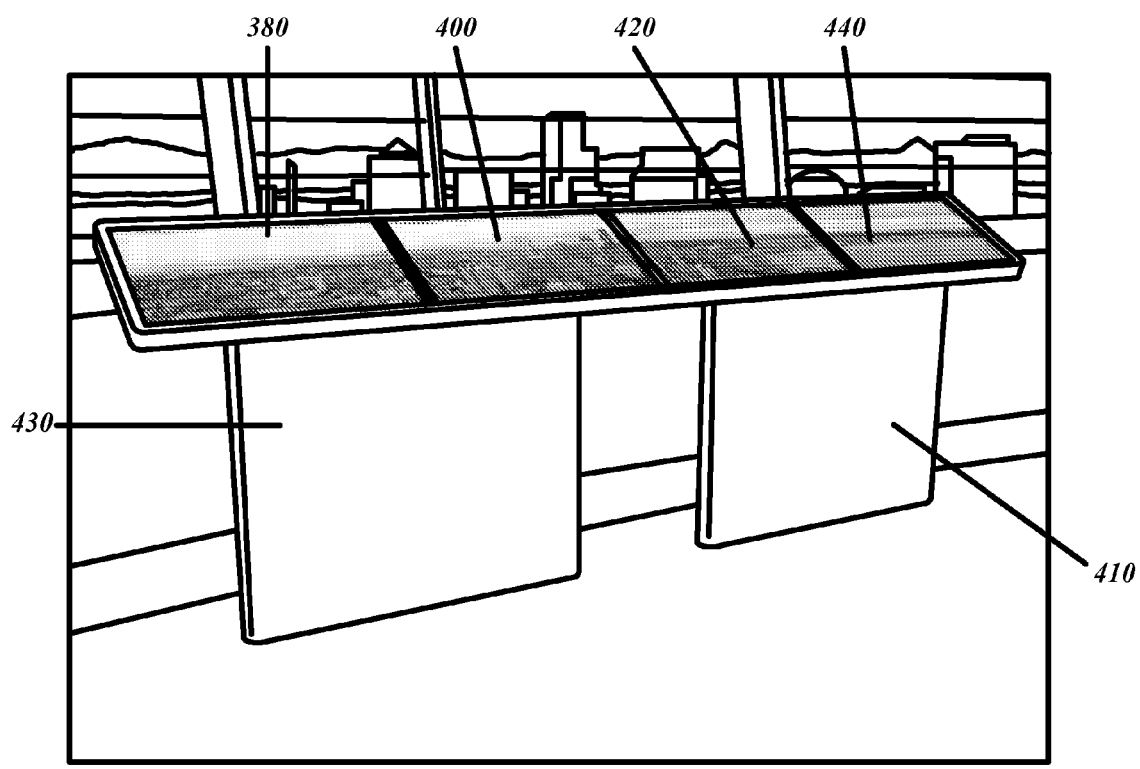
FIG. 9 shows a portion of a time-lapse station according to an embodiment of the present invention

The camera station 290 (FIGS. 1, 3, and 8A-8C) includes a camera display 300, a camera 310, a camera computer 320, camera controls 340, a camera touch screen 360, a camera control stand 330, and a camera kiosk 350. Each camera kiosk 350 supports a camera display 300, and the camera touch screen 360 and camera controls 340 are supported on the control stand 330. Note that the controls 340, as well as any other controls of any station, can be wireless, and can be also activated and controlled by user motion or voice or other user action for activating or controlling the camera controls 340. The controls 340 (FIG. 8C) can include a joystick 342 for changing the aim of the camera 310, a throttle 344 for zooming the camera 310, and a wheel 346 for fine adjustments to the focus of the camera 310. The camera station 290 displays a map with icons 348 identifying points of interest (FIG. 8B). When a user touches the touch screen 360, a coordinate request is sent to the camera 310, and the camera 310 aims at the requested coordinates. The camera 310 is located on a roof (not shown) or other advantageous viewpoint operable to enable a line of sight to requested coordinates. The coordinates for the camera aim are stored on the server computer 220 along with a record of the coordinates selected by users. Using the coordinates, the station 290 can display icons overlaying the view of the camera 310, the icons marking points of interest, such as businesses that partner with a practitioner of an embodiment of the invention. In that case, the businesses can supply content to be displayed when a user selects the icon of the business, and can additionally have remote stations equipped to send and receive live remote feeds, and allow users at the locations to interact. For example, a user may select a camera view of a local restaurant and decide to make a reservation at that restaurant. The user may then select the icon associated with that restaurant view to enable the user the option to contact the restaurant through a station configured to provide reservations at the restaurant. Additionally, camera stations 290 maybe dedicated to a single location or event. Remote camera stations may be placed in any location, including ferries or in ballparks or other venues, and broadcast live feed to the dedicated camera stations. In another embodiment, the remote camera stations are configured to provide taped events and location views to the camera station 290.

Figure 4A:
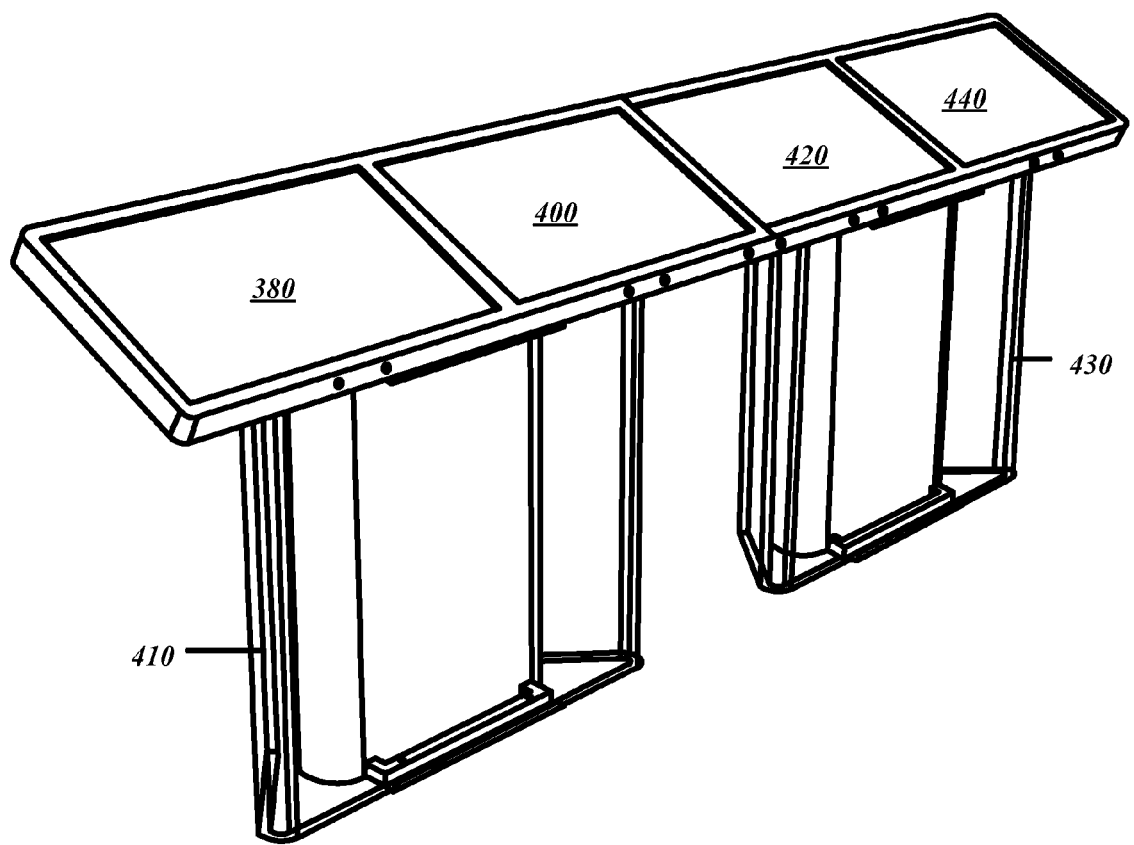
FIG. 4A shows portions of a time-lapse station according to an embodiment of the present invention.
Figure 4B:
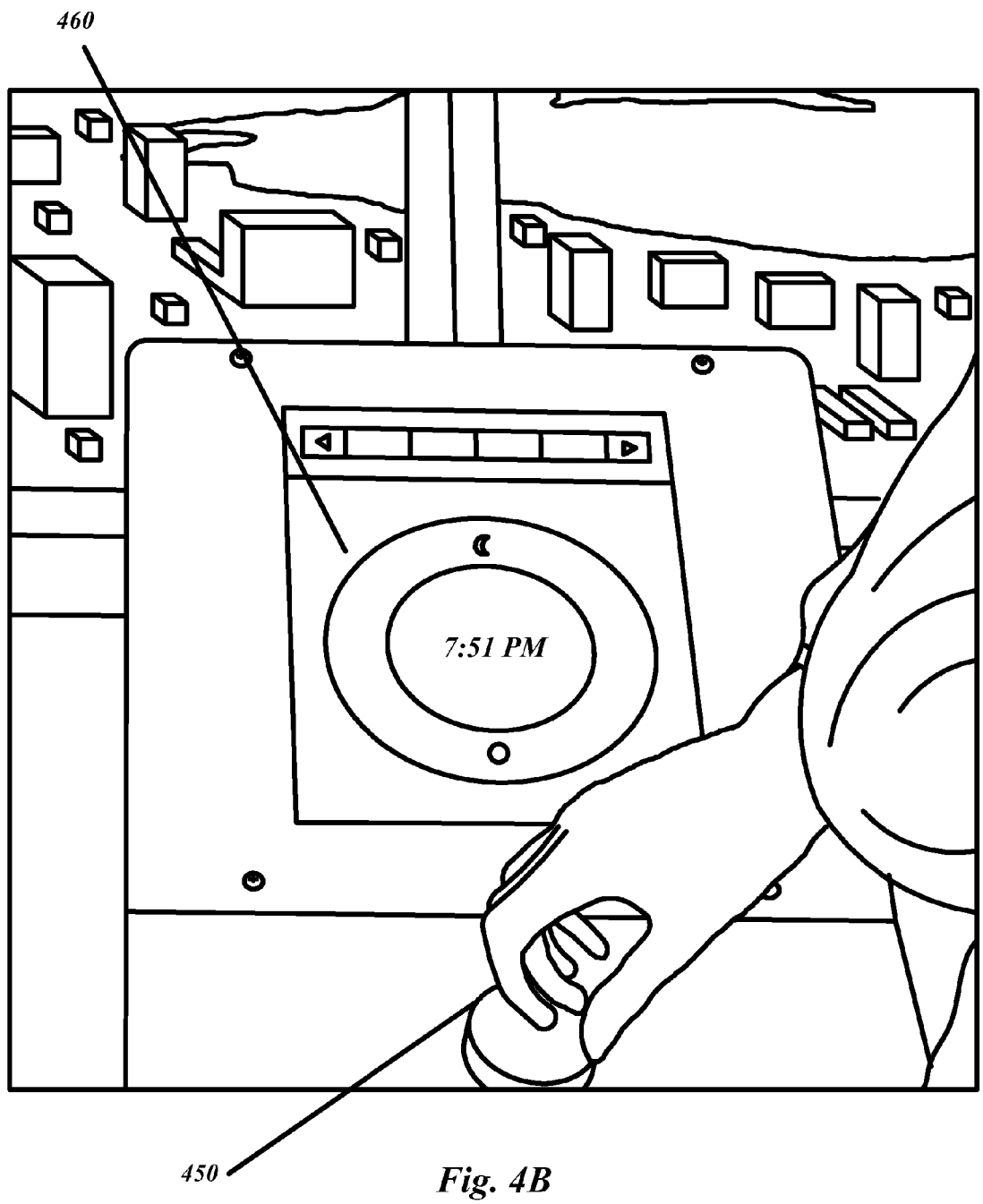
FIG. 4B shows an embodiment of a time-lapse touch screen according to an embodiment of the present invention.
Figure 5:
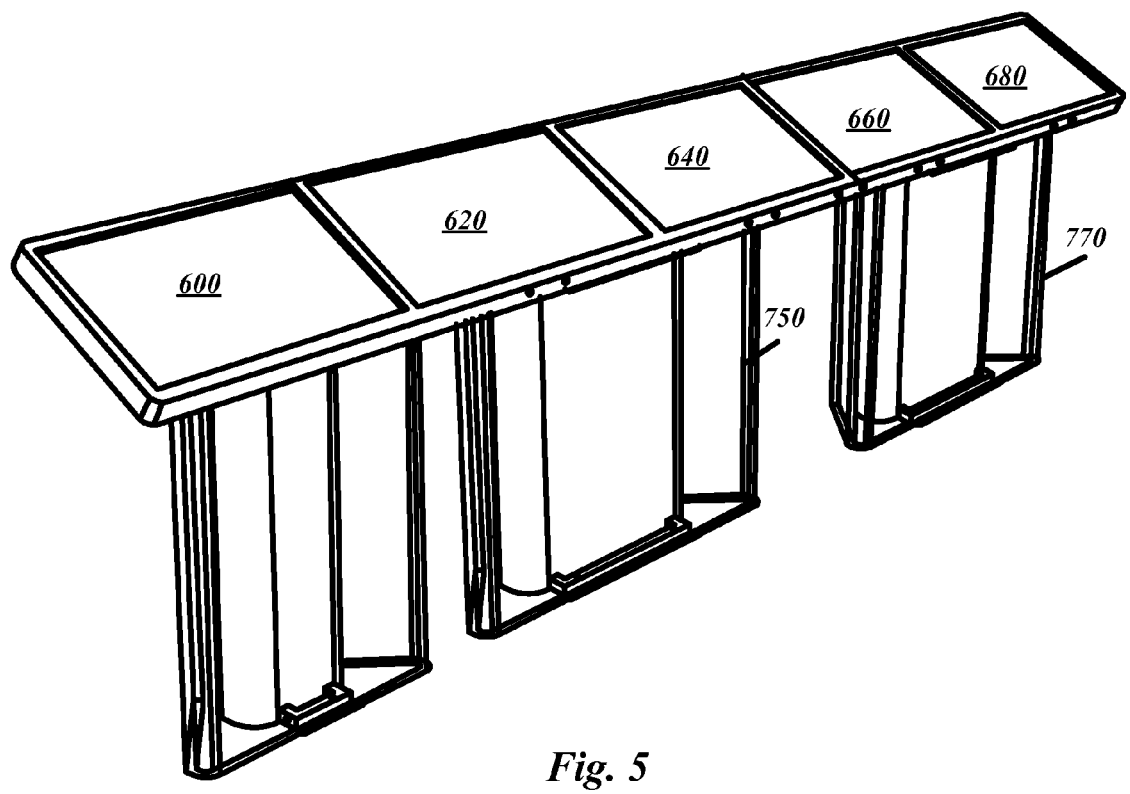
FIG. 5 shows portions of a reveal station according to an embodiment of the present invention.

The time-lapse station 370 (FIGS. 1, 4A, 4B, and 9) includes four time-lapse displays 380, 400, 420, 440, a time-lapse touch screen 460, a time-lapse computer 480, and a pair of time-lapse kiosks 410,430. The time-lapse station 370 allows a user to control viewing of a time-lapse series of 360-degree panoramic photographs of the locality. The displays 380, 400, 420, 440 show a set of four pre-defined images based on a user selection. Users select images via the touch screen 460 and knob 450 (FIG. 4B). Turning the knob 450 moves the images chronologically forward or backward. The touch screen 460 may be used to pick a specific time or event, to view, as well as pan left and right. Times selected, events selected, and session lengths are tracked at the server 220. The times and events may be organized according to user interests; for example, a user can pick "Sailing" and view a series of sailing images taken in the locality, and icons of sailing businesses partnered with the practitioner of an embodiment of the invention can be presented. Similarly, a user interested in "Baseball" could choose to view images of a local ballpark, and icons for ticket sales can be presented. In another example, the time sequence 380, 400, 420, 440 is configured to show the same time-lapse series of 360-degree panoramic photographs of the locality at different times of a day to show transitions between day and night, different times of a calendar year to show the seasonal effects, and over years or decades to show changes in the location over time. It is an option of an embodiment to configure in any array the time-lapse station 370, time-lapse displays 380,400,420,440, time-lapse touch screen 460, time-lapse computer 480, and time-lapse kiosks 410,430.

Figure 10:
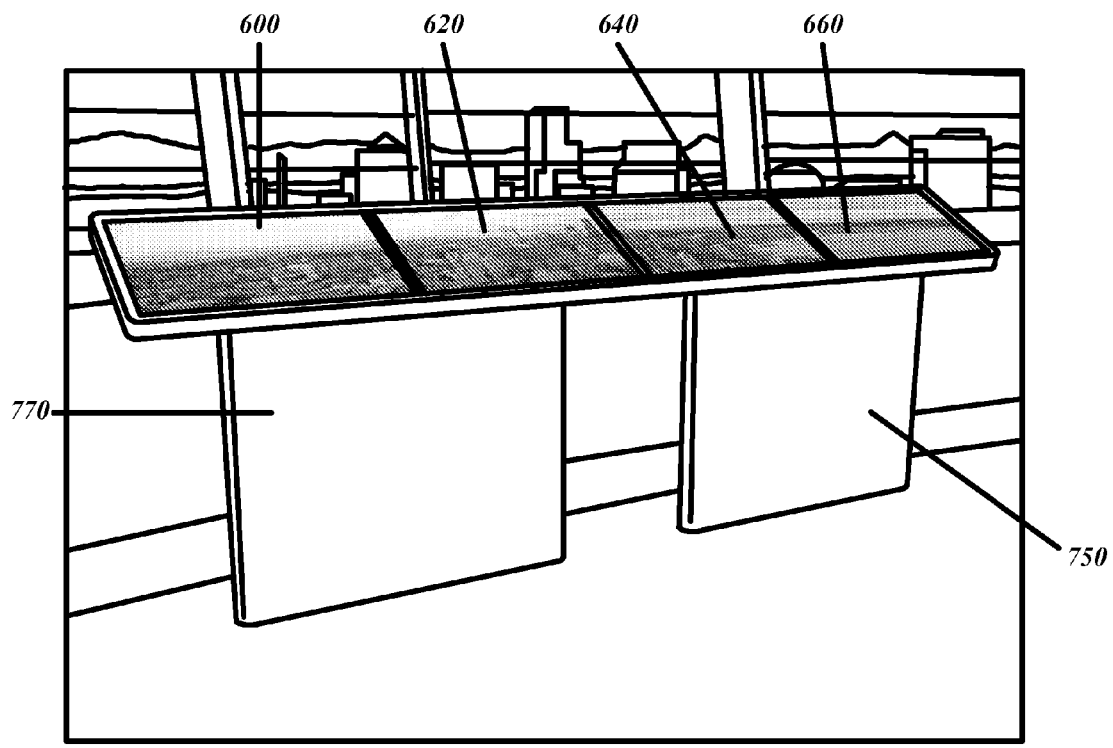
FIG. 10 shows a portion of a reveal station according to an embodiment of the present invention.
Figure 17A:
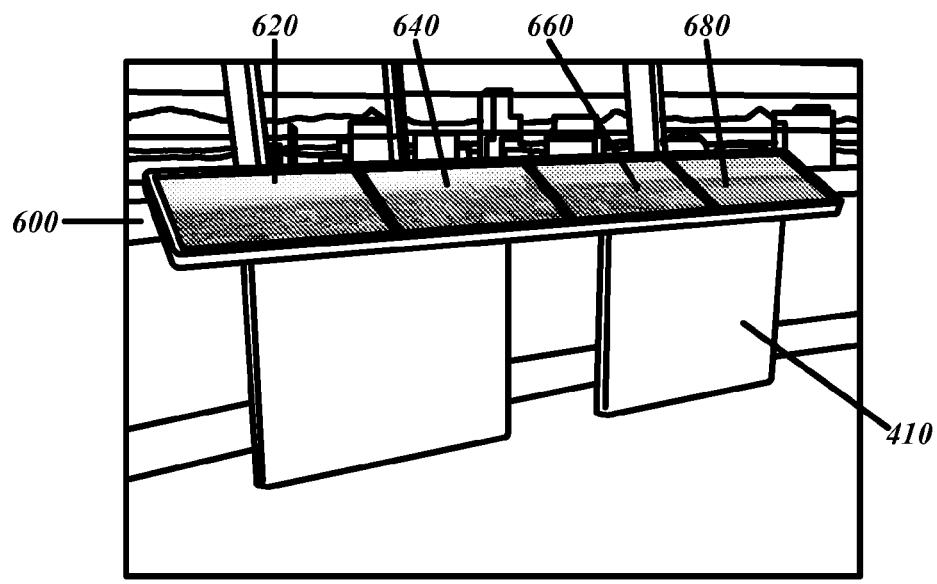
FIG. 17A shows a portion of a site including a reveal station according to an embodiment of the present invention.
Figure 17B:
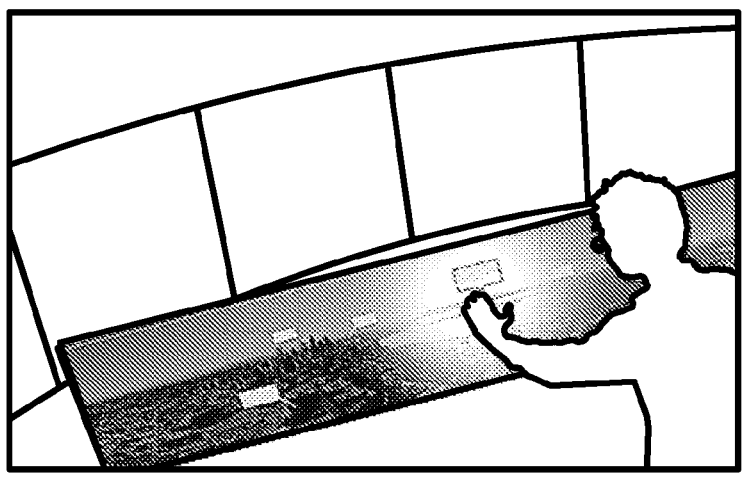
FIGS. 17B-17H illustrate screenshots of a reveal station according to an embodiment of the present invention.
Figure 17C:
Figure 17D:
Figure 17E:
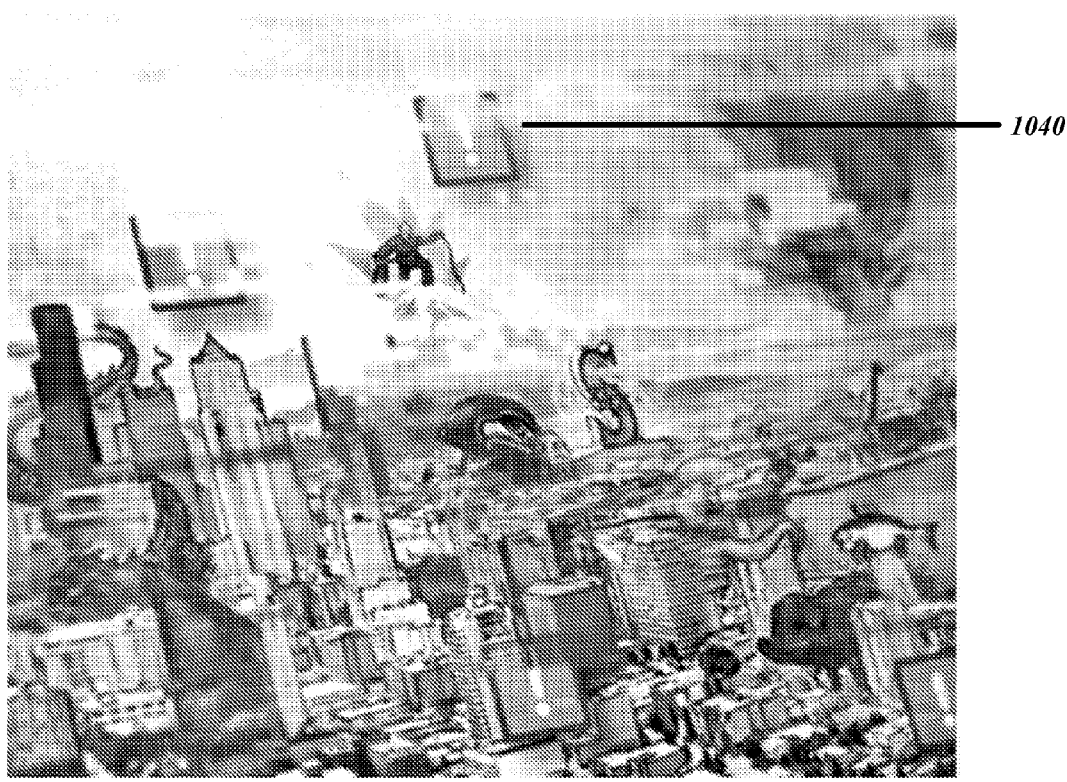
Figure 17F:
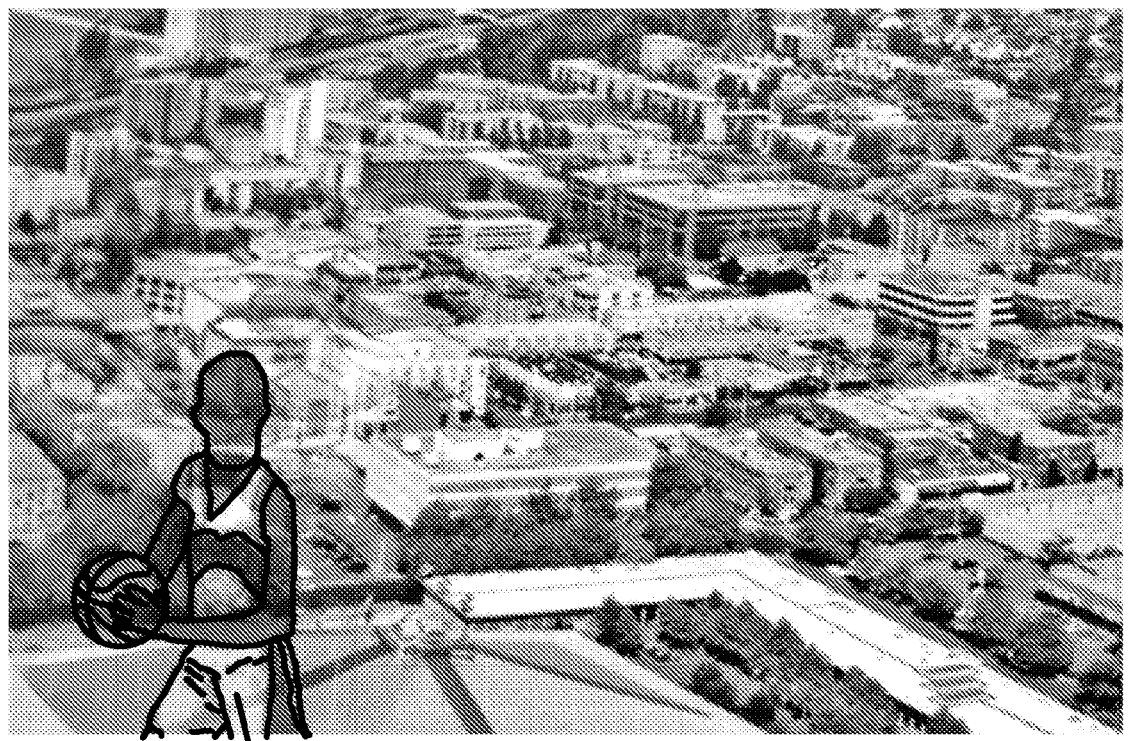
Figure 17G:
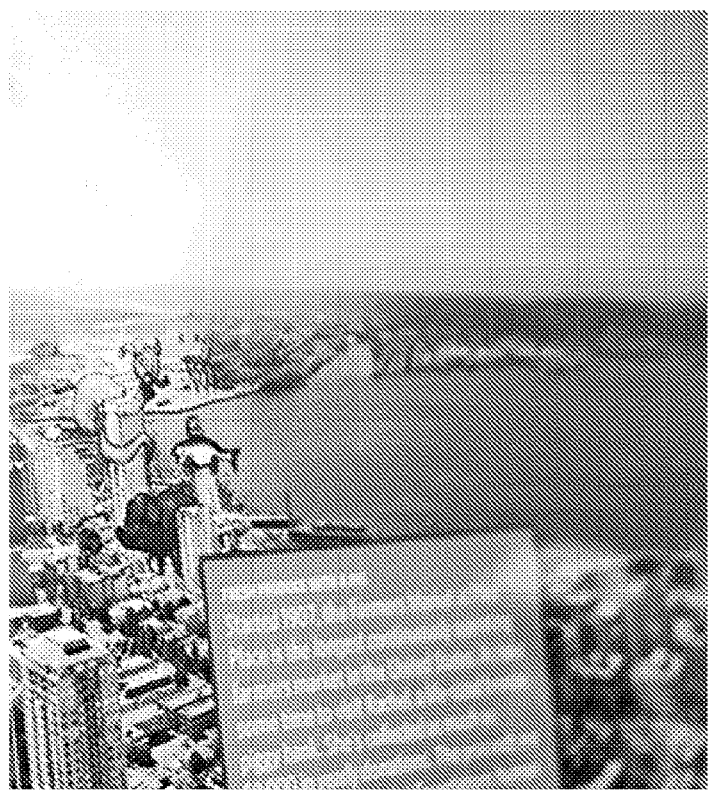
Figure 17H:

The reveal station 490 (FIGS. 1, 5, 10, and 17A-17H) includes reveal motion detectors 500, 520, 540, 560, 580, reveal displays 600, 620, 640, 660, 680, reveal computers 700, 720, 740, 760, 780, and reveal kiosks 750, 770. The alternate embodiment shown in FIG. 10 includes four detectors, displays, and computers. The content on each display 600, 620, 640, 660, 680 is rendered to give the impression of a continuous, panoramic view of the locality. The motion detectors 500, 520, 540, 560, 580 detect a user's motion, and in response, the display 600, 620, 640, 660, 680 "reveals" or overlays an illustrated version of that portion of the map over which the user's hand is positioned (FIGS. 17D and 17E). The view includes illustrations and icons, allowing for selection of content. User selections are tracked at the server 220. The reveal station 490 (as well as any other station) can be combined with an additional display that presents content selected on the reveal displays 600, 620, 640, 660, 680. While the present embodiment of the invention presents the use of a user's hand as a reveal to cause the rendering of a continuous, panoramic view of a locality, the reveal can be anything else capable of causing the motion detectors 500, 520, 540, 560, 580 to detect a user's motion.

Figure 6:
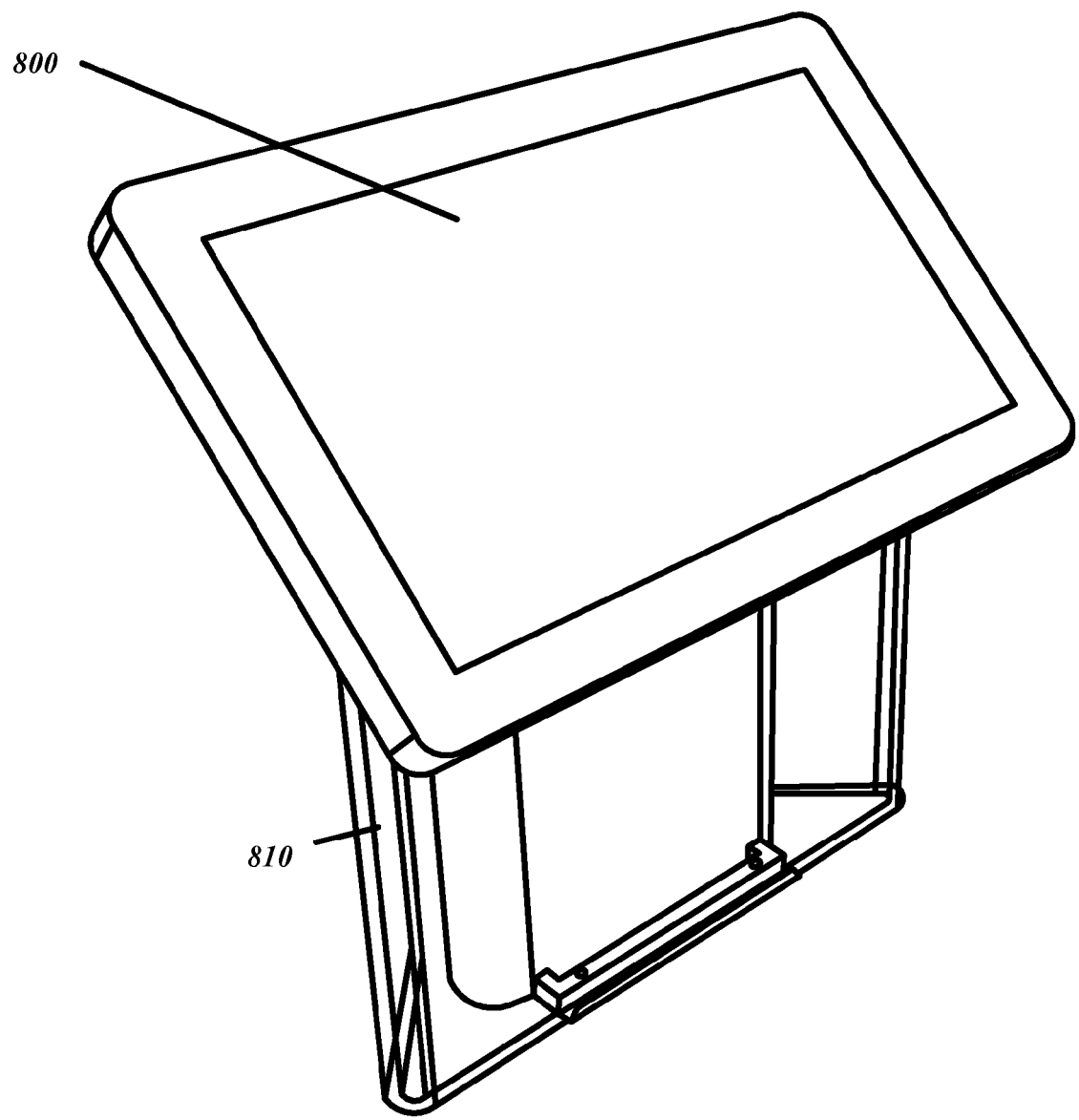
FIG. 6 shows portions of a vignette station according to an embodiment of the present invention.
Figure 11:
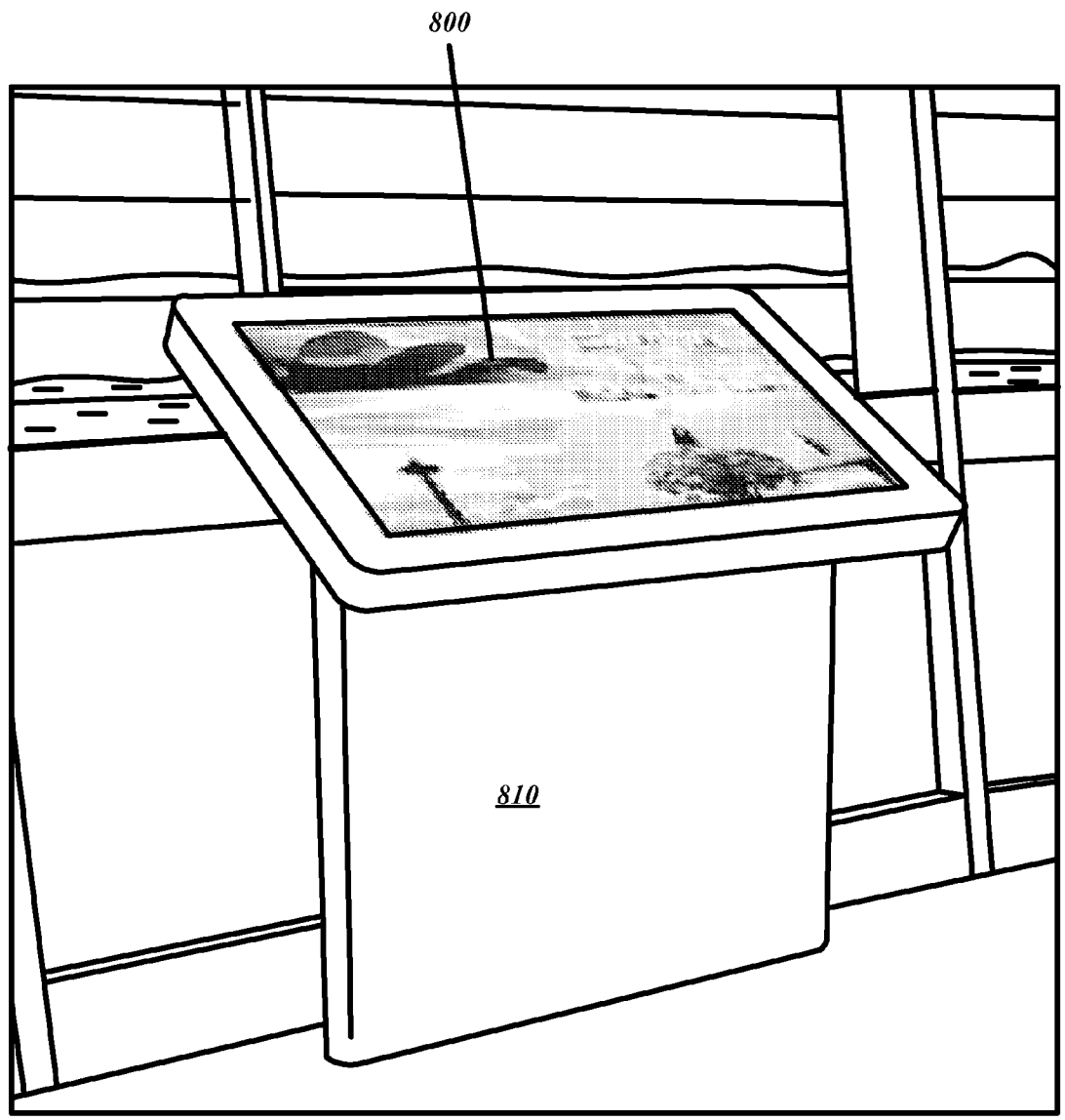
FIG. 11 shows a portion of a vignette station according to an embodiment of the present invention.

The vignette station 790 (FIGS. 1, 6, and 11) includes the vignette display 800, vignette computer 820, and vignette kiosk 810. The vignette station 790 allows users to select and view video vignettes (short multimedia presentations) of, for example, interviews with local workers and residents and performances by local artists. The names of the videos and the videos selected by users are stored on the server. In addition to person-centered vignettes, location-centered vignettes can be included. Location-centered vignettes provide "bird's-eye" or "cabbie's-eye" views of locations of interest.

Keyboard entry to any of the computers in the network 200 can be achieved remotely. All displays may be touch screen displays. All stations can include one or more speakers. Each station may include customized software and content located on the respective station computer.

The server computer 220 supports the various stations 250, 290, 370, 490, and 790, in varying degrees. The server 220 is used to provide configuration information and content, collect tracking information, and host websites for tourists and locals. All content is configurable from the administration computer 240.

Figure 12:
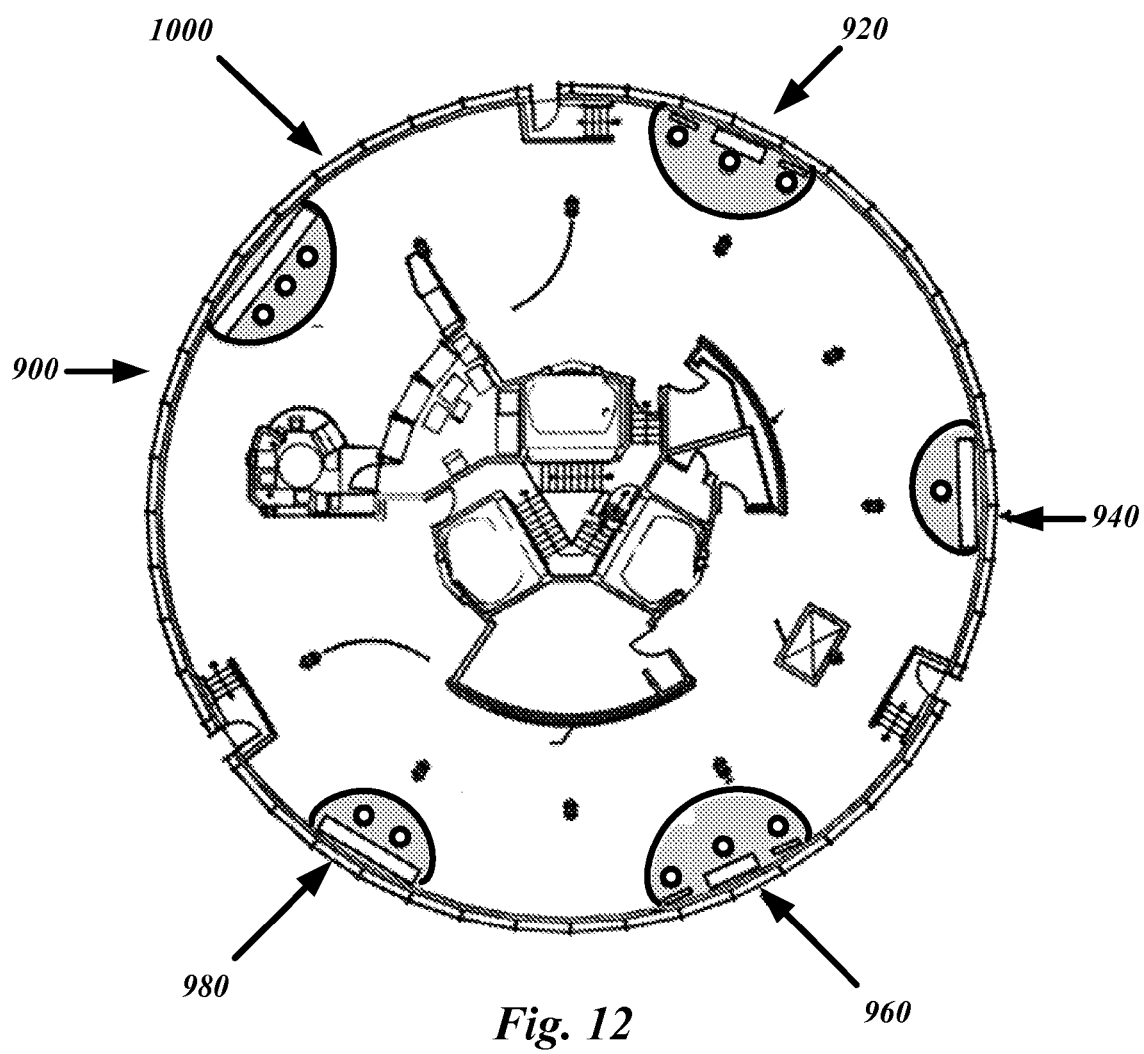
FIG. 12 shows an embodiment of a floor plan of a system according to the present invention.

FIG. 12 shows an embodiment of a floor plan 900 of the network 300 of FIG. 1. The floor plan 900 includes five embodiments of sites 920, 940, 960, 980, 1000, and each site 920, 940, 960, 980, 1000 includes one or more stations 250, 270, 370, 490, 790, or combinations of stations. Cards and card readers (not shown) can be included with any site to allow tracking of usage, storage of data, and other purposes, by users and practitioners of an embodiment of the invention.

Figure 13:
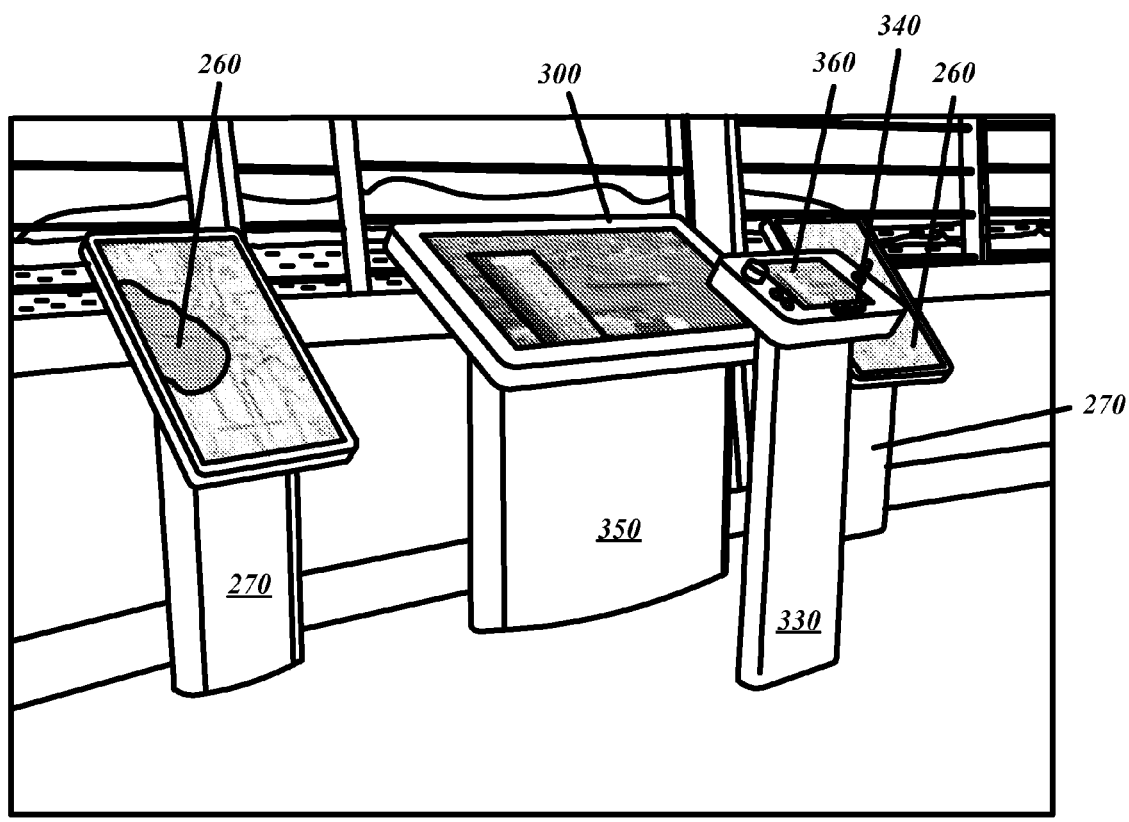
FIG. 13 shows a portion of a site including a camera station and a pair of map stations.
Figure 14A:
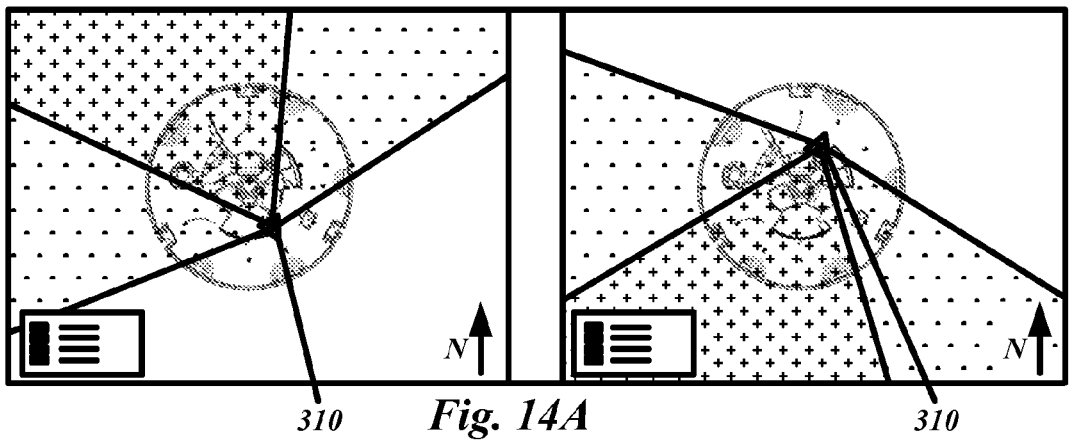
FIG. 14A shows the placement of cameras of a pair of camera stations.

Sites 920 and 960 are northern exposure and southern exposure, respectively, viewing sites. Each site 920, 960 (FIG. 13) includes a camera station 290 with a map station 250 on either side of the camera station 290. The camera 310 of site 920 is oriented to provide 180 degrees of coverage north of the location of the cameras 31, and the camera 310 of site 960 is oriented to provide 180 degrees of coverage south, thereby providing 360 degree coverage of the view (FIG. 14A). Visitors can operate—pan, tilt, zoom—the camera 310 using the controls 340 and screen 360 mounted on the stand 330 in front of the display 310; the screen 360 set within the controls 340 shows which direction the camera 310 is pointing. Selecting a point of interest allows users to view a "bird's-eye view" film clip from the point of interest to the location of the system 200 and vice versa.

Figure 14B:
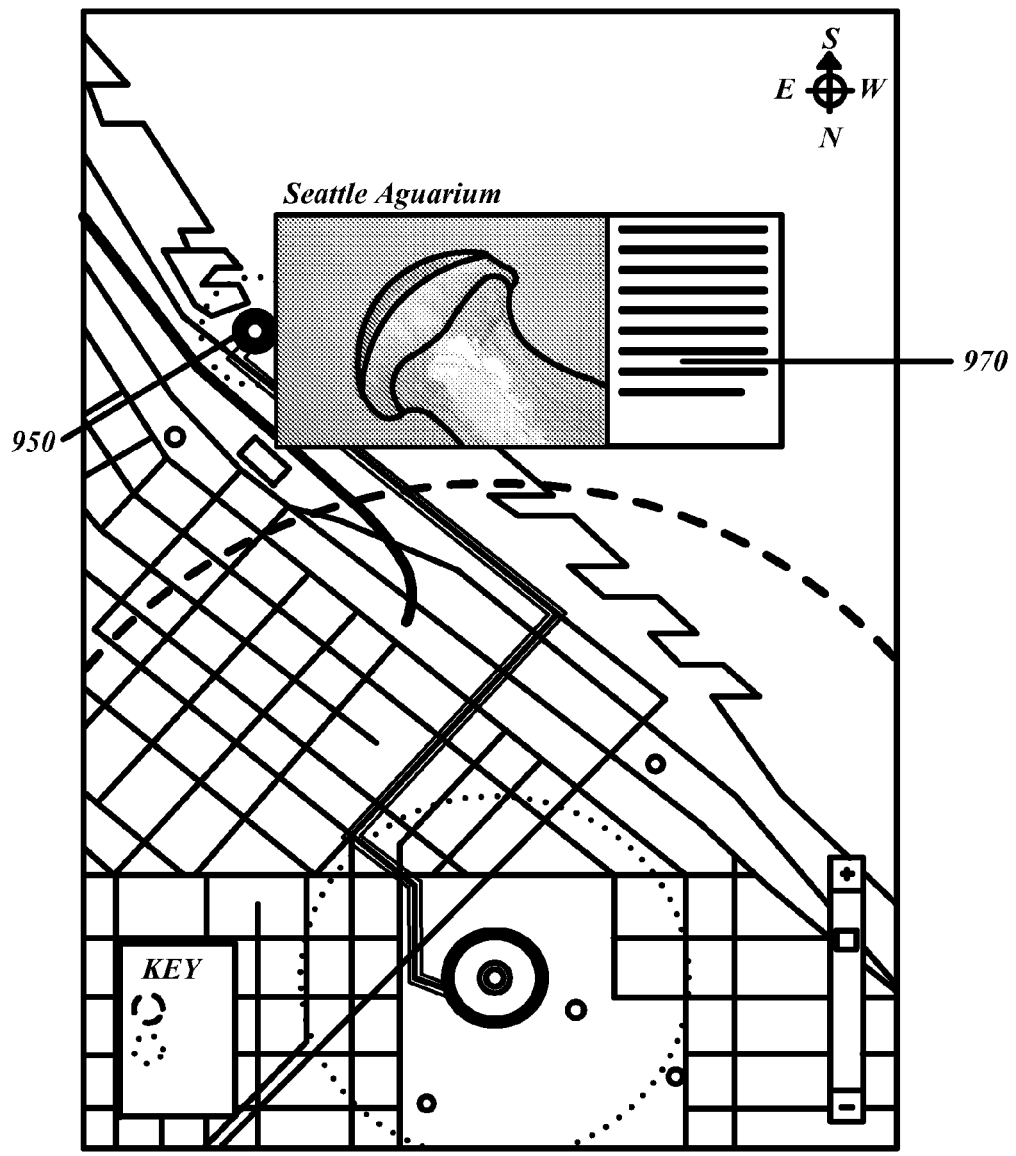
FIG. 14B illustrates some functionality of a map station of an embodiment of the present invention.
Figure 15:
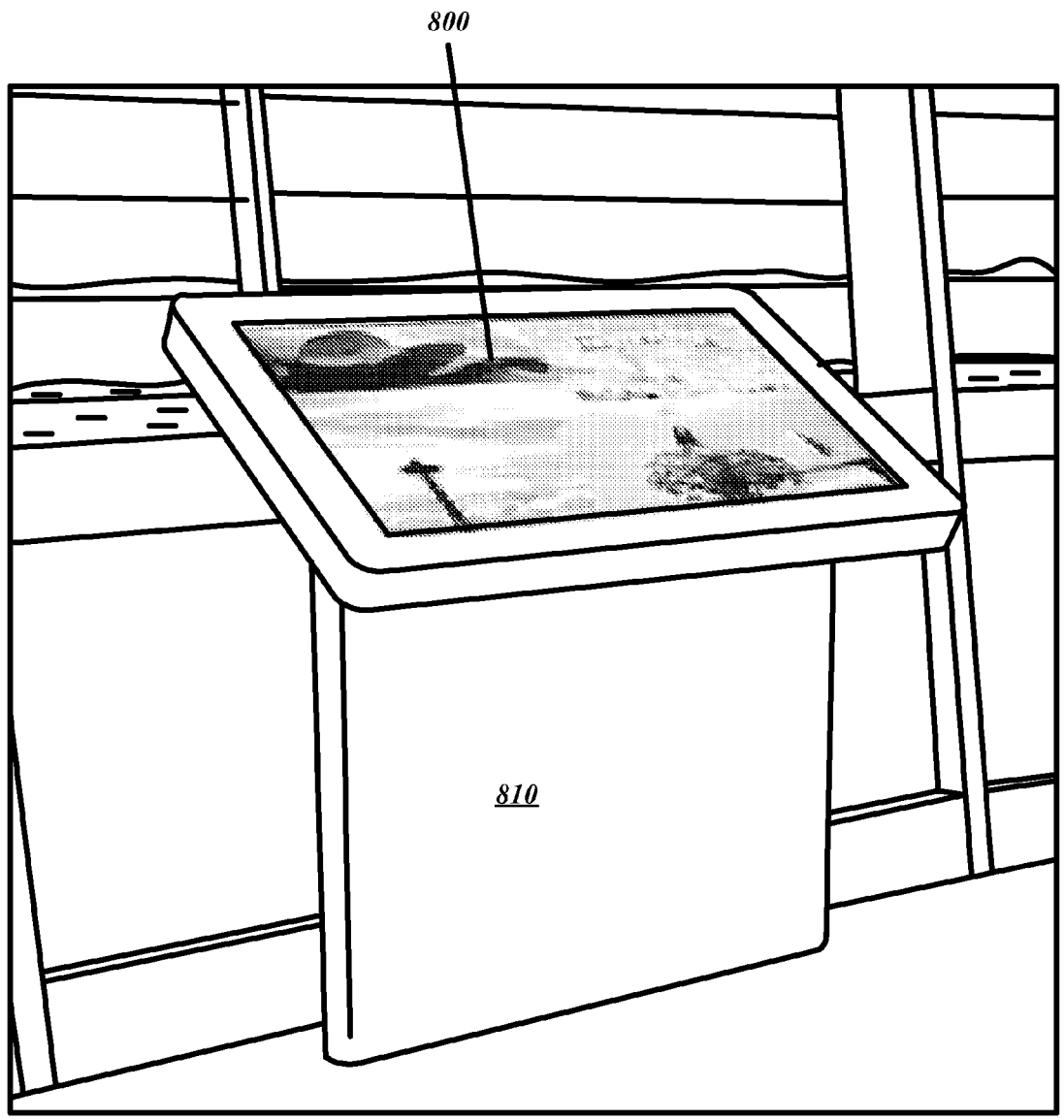
FIG. 15 shows a portion of a site including a vignette station according to an embodiment of the present invention.

Flanking the camera station 290 are the two monitors 260 of the map stations 250. Displayed on each monitor 260 is a map of the local region, with points of interest marked 950 (FIG. 14B). Using touch screen navigation of the monitors 260, visitors can zoom in on a closer level of map detail. Touching a marked point of interest 950 launches a window 970 providing more content, the content including short motion video, slide shows, live streaming video from remote cameras, and any other relevant content. Speakers (not shown) are mounted on the ceiling above the monitors 260.

Figure 16A:
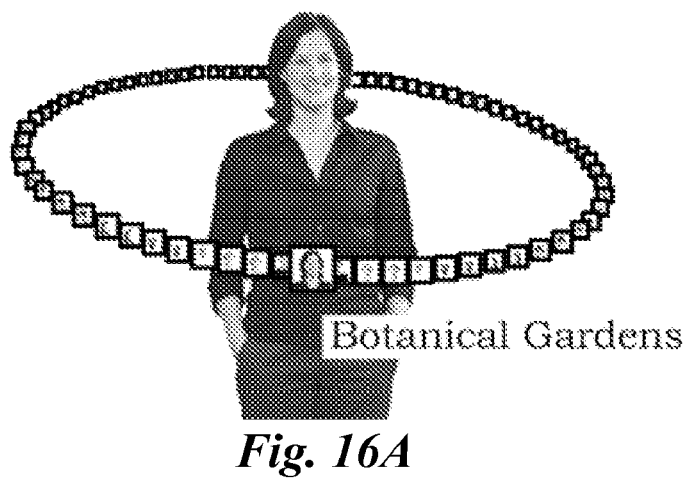
FIGS. 16A-16F illustrate screenshots of a vignette station display according to an embodiment of the present invention.
Figure 16B:
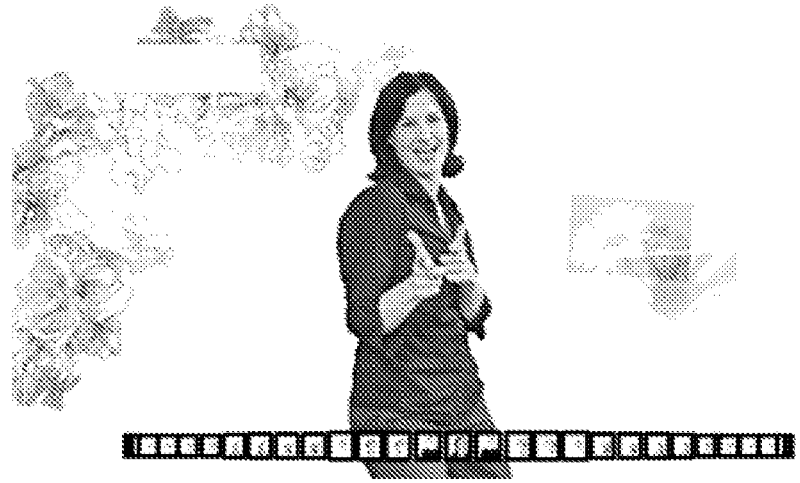
Figure 16C:
Figure 16D:
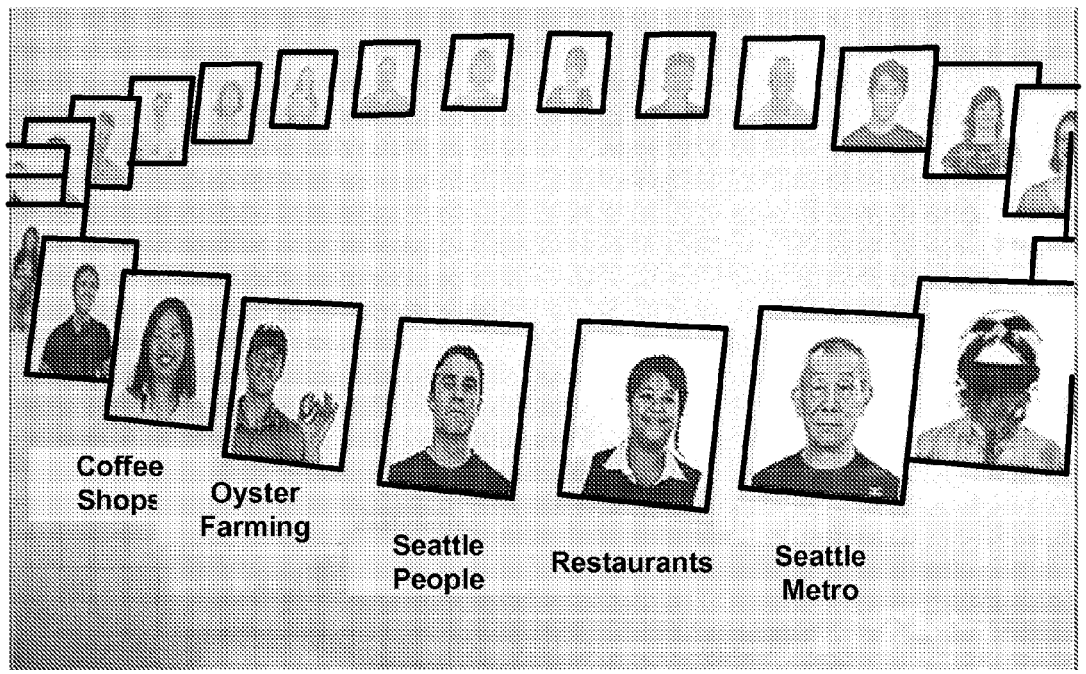
Figure 16E:
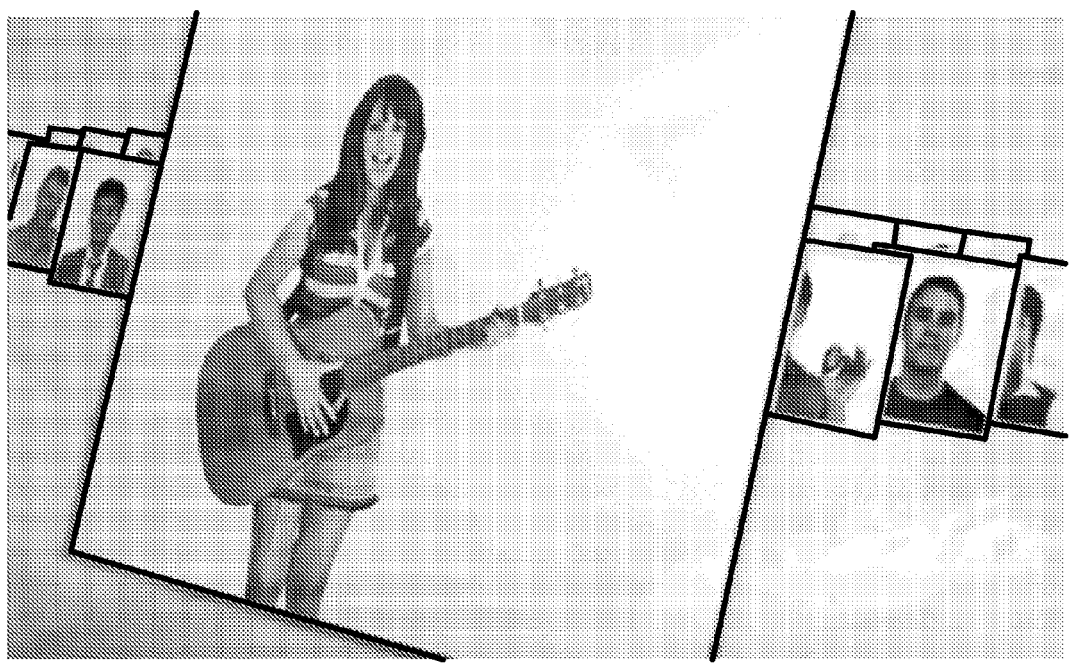
Figure 16F:
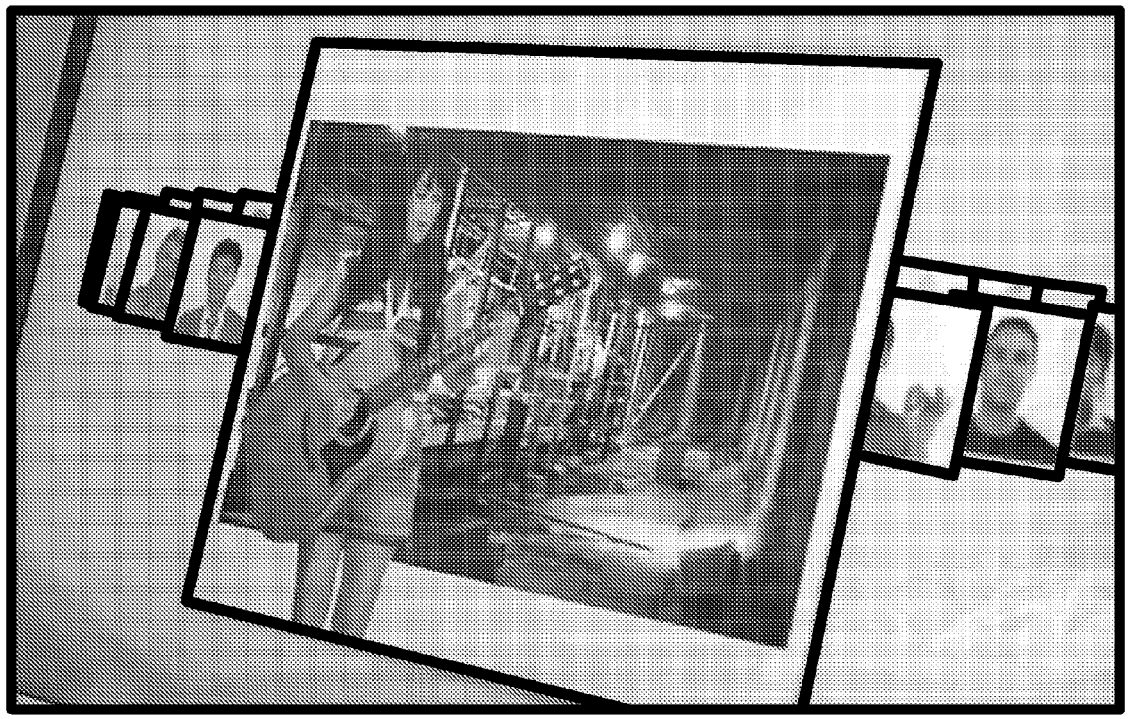

Site 940 includes (FIGS. 15 and 16A-16F) a vignette station 790. Content is comprised of 'real stories from real people'—high-definition video of local citizens of varying ages, cultures, and occupations, giving their impressions and favorite activities in the area from their own point of view. In addition, live video and audio feeds from remote webcams and remote viewing stations (not shown), can be included, through which users can converse with people at the remote locations. As shown in FIG. 16A-16F, visitors select from a set of people whose images are navigable on-screen by face (FIGS. 16A and 16D), or by content taxonomy (e.g. activities, landmarks, places to eat, etc.). Once a personality is selected, an introduction can launch (FIGS. 16B and 16E), and a vignette with video and audio can follow (FIGS. 16C and 16F). For example: a mountain climber may talk about the outdoor activities—visitors can then select from a handful of icons that give more information on any of those sub topics, or navigate to another personality on another topic. The site 940 can be used to engage visitors with local activities on an authentic basis, give locals a sense of ownership, and ambassadorship for their city, and lay the groundwork for visitors and locals to produce more content/stories on site to cycle through the site 940. For instance, a theme of the site 940 can be "I am Seattle" for a network 300 located in Seattle, Wash. The phrase can easily be adapted to other interested locations.

Site 980 includes (FIGS. 17A-17H) a reveal station 490. The displays 600, 620, 640, 660, 680 show a single high-resolution, 360-degree panorama image of the local landscape as photographed from, for example, the roof of the location housing the system 200. The motion detectors 500, 520, 540, 560, 580 (not shown) are oriented to detect motions over the displays 600, 620, 640, 660, 680, such as visitors waving their hands (FIGS. 17B and 17D), and signal the appropriate reveal computer 700, 720, 740, 760, 780 to reveal a secondary image layer 1020 beneath the photograph (FIGS. 17C, 17E, and 17F) corresponding to the location of the user's hand. The layer 1020 is a photo-realistic illustration of the same landscape, with points of interest called out through whimsical illustration 1020 and icons 1040. Touching any of the illustrations 1020 and icons 1040 reveals windows 1060 with additional content (FIGS. 17G and 17H) related the point of interest, including factoids and trivia, video clips, live views, and other content such as business-specific information including restaurant menus, ticket pricing, and similar content.

Figure 18A:
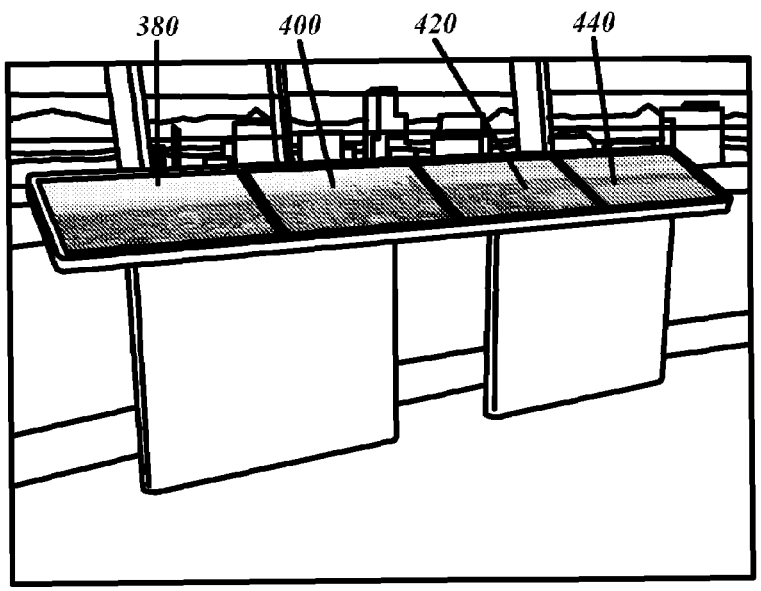
FIG. 18A shows a portion of a site including a time-lapse station according to an embodiment of the present invention.
Figure 18B:
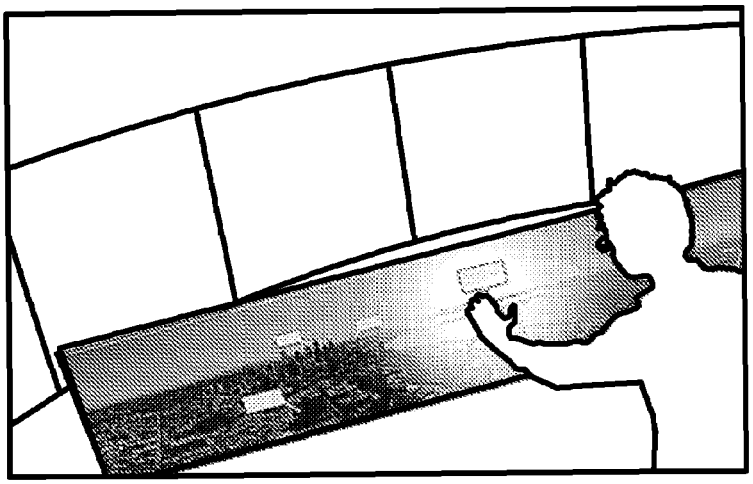
FIGS. 18B and 18C illustrate some functionality of a reveal station according to an embodiment of the present invention.
Figure 18C:
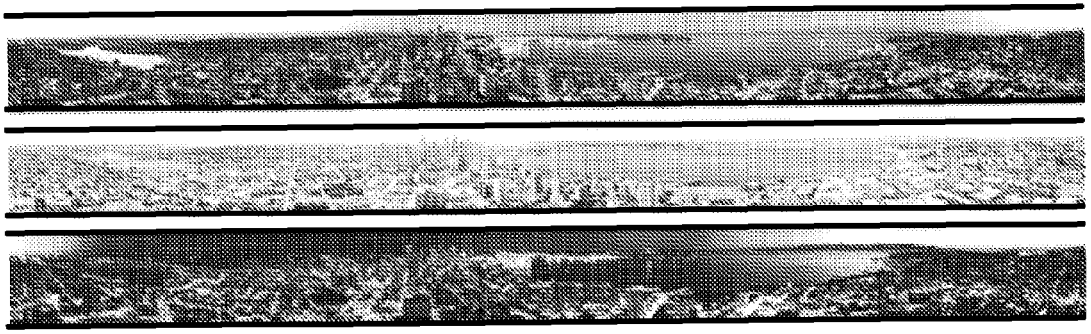

Site 1000 includes (FIGS. 18A, 18B, and 18C) a time-lapse station 370. The displays 380, 400, 420, 440 show a single high-resolution, 360-degree panorama image of the local landscape as photographed from the roof of the location of the system 200, or other convenient location. Times or events may be selected. Traffic moves, the sun comes up, ferries come and go—users can speed up or slow down the flow of images; if users reverse the direction of the knob 450 (FIG. 4B), the time-lapse film advances backward.

Though specific embodiments of sites have been illustrated and described above, it will be appreciated that there are many possible configurations of sites. For example, a camera station 290 could be grouped with a map station 250, such that the map station display 260 would automatically display a portion of a map with interactive icons for locations corresponding to the area being shown by the display 300 of the camera station 290. The icons might represent live webcams located in various parts of the area, and remote camera stations at locations partnered with a practitioner of an embodiment of the invention. In this way, users can explore the surroundings with the camera station 290 and learn more about any point of interest seen on the camera display 300 by activating the appropriate icon. Activating the icon of a partner of a practitioner of an embodiment of the invention can result in the display of further content choices. Those choices can include virtual tours of retail outlets, menus and reservation systems of restaurants, or other content relevant to the location. Similarly, a vignette station 790 can be grouped with the camera station 290 and map station 250. The map station 250 can include vignette icons activatable to display person-centered and location-centered vignettes, thus allowing users to access vignettes by location. A time-lapse station 370 covering a time period of many years can be grouped with a vignette station 790. As images from different times are displayed, activatable icons corresponding to a particular event, era, or location during the time displayed can active historical vignettes.

Additionally, any station can include a projector to project images shown on the respective station display. Projectors can include projection screens that lower to cover one or more windows near the location of the station. In this way, during bad weather or other circumstances preventing a visitor to take full advantage of a view-based tourist-attraction, the projector and screens can be used to provide an alternative. Thus, a time-lapse station 370 may include a projector. The station may be located near a window or windows through which a visitor may view an attraction such as Mount Rainier. On days when clouds or inclement weather obstruct the view of Mount Rainier through the windows, the projector screens may be positioned in front of the windows providing the view, and time-lapse images of Mount Rainier may be projected on to the screens, the images controllable by a consumer. In this way, the attractiveness of view-based tourist destinations may be enhanced to be desirable even under circumstances that would otherwise decrease the desirability of the destination.

Many takeaway items can be associated with the interactive media system. Information may be printed or transferred to an electronic storage medium such as an iPod® or portable storage device, or other devices. Maps, itineraries with information about the points of interest selected by the user, coupons, city and location guides, images viewed by the user, and memorabilia can be provided to users.

As can be appreciated, a tourist attraction drawing many visitors can use an embodiment of the invention to gain useful information about visitor interests and preferences. Any interaction a user has with a site of an embodiment of the invention may be recorded. The recorded interactions can be used to inform business decisions of the tourist attraction.

A web site for feedback from locals and tourists can be used with an embodiment of the invention. The site may also include reviews of points of interest from locals and tourists; a reference and fulfillment engine, images and views from the stations, and other useful information.

Practitioners of an embodiment of the present invention can enter into networks (below) with other tourist attractions, businesses, and entities, including those indicated by the analysis of the recorded interactions of visitors to the interactive media system.

Figure 19A:
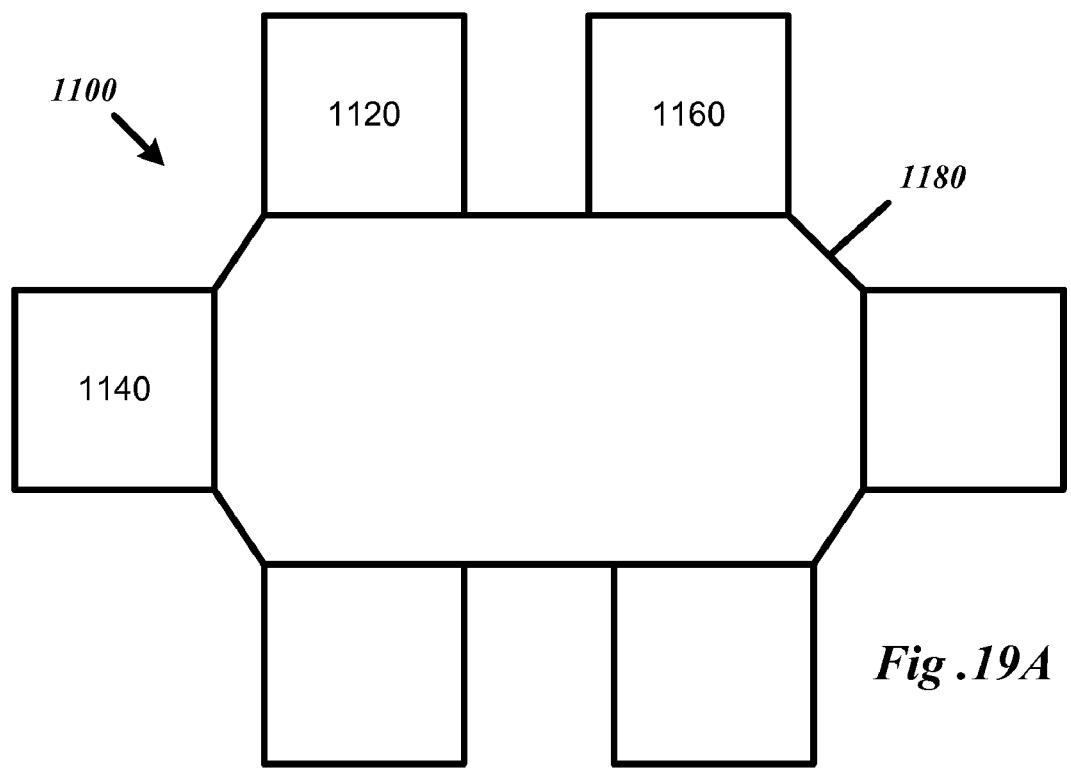
FIG. 19A is a diagram of a hub network according to an embodiment of the present invention.

FIG. 19A shows an embodiment of a network 1100 of tourist hubs 1120, 1140, . . . , 1160 according to an embodiment of the present invention. A tourist hub 1120 is a tourist attraction or similar entity. Most broadly, a tourist hub 1120 is any venue or entity capable of providing an embodiment of the invention to consumers. In a specific embodiment, the tourist hub 1120 is the Space Needle located in Seattle, Wash., and the other hubs 1140, 1160 include other members of the Confederation of Great Towers. The hubs 1120, 1140, . . . , 1160 are in data communication 1180 with each other. Thus, a visitor to the Eiffel Tower in Paris could view and interact with visitors at the Space Needle in Seattle, Wash. Note that network configurations and members other than those of the network 1100 (and the network 1200, below) are included in the scope of an embodiment of the invention.

Figure 19B:
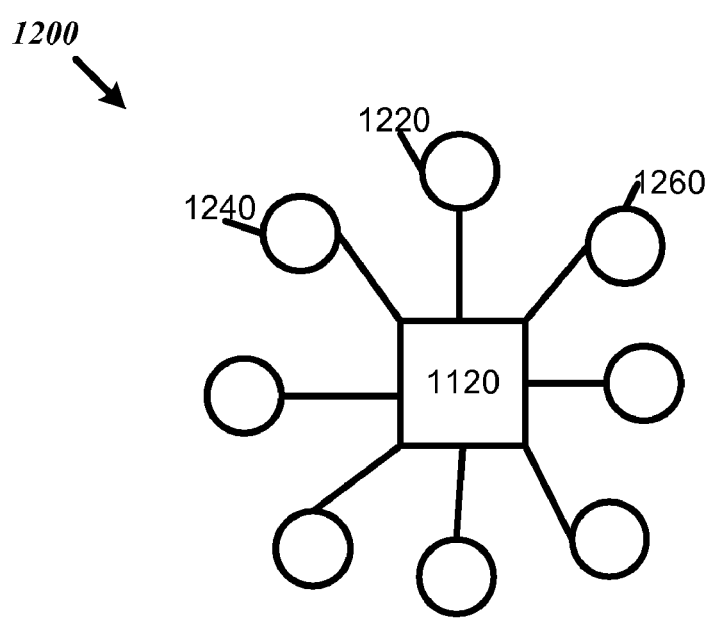
FIG. 19B is a diagram of a local network according to an embodiment of the present invention.

FIG. 19B shows an embodiment of a local network 1200 according to an embodiment of the present invention. The local network 1200 includes a tourist hub 1120 in data communication 1180 with local members 1220, 1240, . . . , 1260. The members 1220, 1240, . . . , 1260 can include tourist attractions, sporting venues, retail businesses, restaurants, motels, local residents, and other entities, and can also be in data communication with each other.

While the preferred embodiment of the invention has been illustrated and described, as noted above, many changes can be made without departing from the spirit and scope of the invention. For example, sites and stations can have many different configurations, groupings, and purposes. Any business venture or collaboration can be used with an embodiment of the invention. Any functionality described in one station can be included in another station. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method to acquire information content of a view of a landscape seen by an observer comprising:
    manipulating a camera in communication with a client-server computer network in signal communication with a monitor to acquire a live image of at least a portion of the landscape;
    capturing the live image;
    presenting the live image on the monitor in a first layer visible to the viewer;
    underlying the first layer with a second layer having a photo-realistic illustration of the live image, the second layer having regions responsive to at least one physical action conveyed by the observer near or onto the surface of the monitor;
    associating at least one icon with the regions of the second layer;
    interacting with the regions of the second layer via the at least one physical action conveyed by the observer including at least one of hand motion and touching near or onto the surface of the monitor adjacent to the regions of the second layer; and
    displaying the at least one icon onto the live image presented on the monitor;
    recording interactions between the at least one icon and the at least one physical action conveyed by the observer with the at least one icon; and analyzing the recorded interactions.

2. The method of claim 1, wherein displaying the at least one icon includes causing the appearance of at least one of an interactive icon, an illustration, a map, a business specific information, business icons, an historic movie of the landscape, a slide show, a text statement, a live streaming video, a virtual tour, an audio playback, and a vignette relating to the live image presented in the first layer upon conveyance of the at least one physical action to the regions in the second layer.

3. The method of claim 1, wherein underlying the live image with regions responsive to at least one action includes:
    recording coordinates relating to the tilt, pan, and zoom control conveyed by the observer's interaction.

4. A method comprising:
    acquiring a live image of a landscape visible to an observer using a camera located near the observer having a common view with the landscape, the camera in signal communication with a monitor located adjacent to the observer and a client-server computer network;
    presenting the live image on the monitor in a first layer visible to the observer;
    underlying the live image in the first layer with a second layer having regions responsive to at least one physical action conveyable by the observer and touching near or onto the surface of the monitor adjacent to the regions of the second layer;

displaying at least one interactive icon onto the live image;

recording interactions between the at least one interactive icon and the at least one physical action conveyed by the observer with the interactive icon;

analyzing the recorded interactions; and acting on the analysis.

5. The method of claim 4, wherein underlying the live image with regions responsive to the at least one action include observer hand motions near the regions and touching the monitor surface near the regions.

6. The method of claim 4, wherein displaying the at least one interactive icon includes at least one of a business icon, a map, an illustration, a text statement, a business specific information, an historic movie of the landscape, an interactive icon, and a vignette relating to the live image.

7. The method of claim 6, wherein acquiring the live image includes: providing at least one of a tilt, a pan, and a zoom control of the camera to the observer.

8. The method of claim 5, wherein analyzing the recorded interaction includes:

determining consumer preferences—among location presented—associated with the at least one business icon, the map, the illustration, the text statement, the business specific information, the historic movie of the landscape, the interactive icon, and the vignette relating to the live image.

9. The method of claim 4, wherein displaying includes presenting the historic movie of the landscape on the monitor placed in line-of-site between the observer and the landscape when the landscape is obscured by inclement weather.

10. The method of claim 4, wherein acting on the analysis includes contacting and forming networks with businesses and tourist attractions associated with the landscape.

* * * * *